United States Patent
Harsha et al.

(10) Patent No.: US 10,574,592 B2
(45) Date of Patent: Feb. 25, 2020

(54) COMPUTE-COMMUNICATE CONTINUUM TECHNOLOGY

(71) Applicants: THE TRUSTEES OF THE STEVENS INSTITUTE OF TECHNOLOGY, Hoboken, NJ (US); CCC TECHNOLOGY HOLDINGS, LLC, New York, NY (US)

(72) Inventors: Solomon Harsha, Los Gatos, CA (US); Khaldoun Khashanah, Oak Ridge, NJ (US)

(73) Assignees: The Trustees of the Stevens Institute of Technology, Hoboken, NJ (US); CCC Technology Holdings, LLC, New York, NY (US)

( * ) Notice: Subject to any disclaimer, the term of this patent is extended or adjusted under 35 U.S.C. 154(b) by 0 days.

(21) Appl. No.: 16/233,588

(22) Filed: Dec. 27, 2018

(65) Prior Publication Data
US 2019/0158427 A1 May 23, 2019

Related U.S. Application Data

(63) Continuation of application No. 15/428,984, filed on Feb. 9, 2017, now abandoned.
(Continued)

(51) Int. Cl.
*H04L 29/08* (2006.01)
*H04L 12/933* (2013.01)
(Continued)

(52) U.S. Cl.
CPC ...... *H04L 49/109* (2013.01); *G06F 15/17381* (2013.01); *G06F 15/8023* (2013.01)

(58) Field of Classification Search
CPC . H04L 49/109; G06F 15/1738; G06F 15/8023
See application file for complete search history.

(56) References Cited

U.S. PATENT DOCUMENTS

| | | | |
|---|---|---|---|
| 2014/0282611 A1* | 9/2014 | Campbell | H04L 49/109 719/313 |
| 2017/0220499 A1* | 8/2017 | Gray | G06F 13/36 |
| 2017/0220511 A1* | 8/2017 | Burchard | G06F 13/4068 |

OTHER PUBLICATIONS

K. Asanovic et al., "The Landscape of Parallel Computing Research: A View from Berkeley", http://www.eecs.berkeley.edu/Pubs/TechRpts/2006/EECS-2006-183.pdf, University of California at Berkeley, Technical Report No. UCB/EECS-2006-183, Dec. 18, 2006.
(Continued)

*Primary Examiner* — Kim T Nguyen
(74) *Attorney, Agent, or Firm* — Greenberg Traurig, LLP

(57) ABSTRACT

The present disclosure relates to Compute-Communicate Continuum ("CCC") technology, which challenges today's use model of Computing and Communications as independent but interfacing entities. CCC technology conflates computing and communications to create a new breed of device. Compute-Communicate Continuum metal algorithms allow a software programmer to compile/link/load and run his software application directly on device hardware providing Super Computing and Extreme Low Latency links for demanding financial applications and other applications. CCC based multiple CCC-DEVICE hardware platforms can be interconnected using its ELL "Metal Shared Memory Interconnects" form what looks like a "single" machine that crosses different geographies, asset classes, and trading venues. Thus, the technology enables the creation of a new category of Compute-Communicate devices (CCC-DEVICE Series appliances) that can connect multiple geographically distributed locations with extreme low latency and provide supercomputing for distributed data using High
(Continued)

Performance Embedded Computing (HPEC) and Extreme Low Latency (ELL) Communications.

6 Claims, 28 Drawing Sheets

Related U.S. Application Data

(60) Provisional application No. 62/293,154, filed on Feb. 9, 2016.

(51) Int. Cl.
*G06F 15/173* (2006.01)
*G06F 15/80* (2006.01)

(56) References Cited

OTHER PUBLICATIONS

H. T. Kung, "Systolic Architectures, Which Permit Multiple Computations for Each Memory Access, Can Speed Execution of Compute-Bound Problems Without Increasing I/O Requirements", IEEE Computer, vol. 15, p. 37-46, Jan. 1982.

A. Agarwal et al., "The MIT Alewife Machine: A Large-Scale Distributed-Memory Multiprocessor", MIT/LCS Memo TM-454, Massachusetts Institute of Technology, 1991.

M. Noakes, D. Wallach, and W. Dally, "The J-Machine Multicomputer: An Architectural Evaluation", in Proceedings of the 20th International Symposium on Computer Architecture, pp. 224-35, San Diego, CA, May 1993.

L. G. Valiant and G. J. Brebner, "Universal Schemes for Parallel Communication", in Proceedings of the 13th ACM Symposium on Theory of Computing (STOC), pp. 263-277, 1981.

D. Haule and A. Malowany, "High-speed 2-D Hardware Convolution Architecture Based on VLSI Systolic Arrays", IEEE Pacific Rim Conference on Communications, Computers and Signal Processing, pp. 52-55, Jun. 1989.

G. Amdahl, "Validity of the Single Processor Approach to Achieving Large Scale Computing Capabilities", Proc. AFIPS Spring Joint Computer Conf., Atlantic City, N.J., Apr. 18-20, 1967.

Mellanox Technologies, Inc, "Introduction to Infiniband", Mellanox Doc. No. 2003WP. No Date.

\* cited by examiner

COMPUTE-COMMUNICATE CONTINUUM TECHNOLOGY

CROSS REFERENCE TO RELATED APPLICATIONS

This application is a continuation of U.S. patent application Ser. No. 15/428,984 filed Feb. 9, 2017 and claiming the benefit of U.S. Provisional Patent Application Ser. No. 62/293,154 filed Feb. 9, 2016, the disclosure of which is incorporated herein by reference in its entirety.

FIELD OF INVENTION

The following disclosure relates to computing and communications technologies, including apparatuses and methods, and more particularly to high performance architectures and programming of distributed/shared computing systems connected by communicative links.

BACKGROUND

Parallel computing uses multiple processing elements simultaneously to solve a problem. The typical types of parallelism include bit level parallelism to instruction level and on to task level. These are accomplished by breaking the problem into independent parts so that each processing element can execute its part of the algorithm simultaneously with the others. The processing elements can be diverse and include resources such as a single computer with multiple processors, several networked computers, specialized hardware, or any combination of the above.

From the above-mentioned processing elements multicore-processing elements, which exist on the same chip can issue multiple instructions per cycle from multiple instruction streams. Of the multicore chips available today, field-programmable gate arrays ("FPGAs") can be used to create hundreds of cores on them by which can be used for multicore parallel computing. However, programming in these languages can be tedious.

Several vendors have created "C to HDL" (i.e., C programming language to hardware description language) tools that attempt to emulate the syntax and semantics of the C programming language, with which most programmers are familiar. The best-known C to HDL tools are Mitrion-C, Impulse C, DIME-C, and Handel-C. Specific subsets of SystemC based on C++ language can also be used for this purpose. But they all cannot use the cores optimally and cannot be programmed for effective performance. So, largely FPGAs today can be used as co-processors to a general purpose computer solving a portion of the large computations such as matrix multiplications, N-body problems etc., but never to be used as general purpose computer to run full-blown applications.

In the recent days many used programming FPGAs using systolic arrays for data-flow computing to solve small compute intensive sub tasks as mentioned above, but still using Verilog or VHDL which is again very tedious thereby cannot be used for general purpose programming. Though systolic array computing provides extremely fast computing on multicore with scalable architecture and can turn many exponential problems into linear or polynomial, they are very difficult to implement and build.

SUMMARY

In view of the foregoing background, the present disclosure relates to a device, system, and method, which use dynamic systolic array networks to enable compute-communicate continuum technology. The system includes a new architecture.

The present disclosure relates to Compute-Communicate Continuum ("CCC") technology, which challenges today's use model of Computing and Communications as independent but interfacing entities. Today in the computer science world, Computing and Communications are two different engineering disciplines. We have addressed the inability of computer engineers to effectively utilize the computing and communications power by combining them in the "Compute—Communicate Continuum".

The device, system and method of the present disclosure conflate computing and communications to create a new breed of device. Compute-Communicate Continuum metal algorithms allow a software programmer to compile/link/load and run his software application directly on device hardware ("the metal") providing Super Computing and Extreme Low Latency links for demanding financial applications and other applications. CCC based multiple CCC-DEVICE hardware platforms can be interconnected using its ELL "Metal Shared Memory Interconnects" form what looks like a "single" machine that crosses different geographies, asset classes, and trading venues. Thus, the technology enables the creation of a new category of Compute-Communicate devices (CCC-DEVICE Series appliances) that can connect multiple geographically distributed locations with extreme low latency and provide supercomputing for distributed data using High Performance Embedded Computing (HPEC) and Extreme Low Latency (ELL) Communications. CCC-DEVICE metal algorithms allow a software programmer to compile/link/load and run his software application directly on device hardware ("the metal") providing Super Computer Performance and Extreme Low Latency links for demanding applications.

The disclosure introduces 4D computers wherein the communications becomes not only fundamental but also integral part of the architecture of the computers. Such uniquely designed compute-communicate devices using CCC technology become polymorphic acting both communications and computing devices. The multi-core CCC-Devices built based on CCC technology can be seamlessly interconnected to form extendable multi-device fabric consisting of High Performance Embedded Compute nodes to act as one computer. Thus creating what we term Fabric as a System (FaST) from device polymorphism.

The method uses FPGA multicore in this system in which FPGAs can be used as general-purpose computer running any typical application written in conventional programming language such as C/C++ or any interpreted languages such as Matlab/ Python/ SLANG with compile/link/run without the burden of an operating system with systolic parallelism.

CCC's FaST based appliances—CCC-DEVICE Series of compute/connectivity hardware platforms can be interconnected using its ELL links to produce what looks like a "single" machine that crosses different geographies, asset classes, and trading venues. The applications are not limited to financial systems.

One aspect of the invention includes a CCC-programming paradigm on modified FPGA's as per CCC-technology, which truly enables systolic parallelism of computing within CCC-Device and across the geographically distributed CCC-Device. Another aspect is that the computing achieved on multiply distributed CCC-Devices truly forms Distributed computing. In another aspect, using CCC-Fast model enables geographically distributed CCC-devices that act as one machine, even though they are plural and geographically distributed. In another aspect, Fast Model truly interconnects geographically distributed exchanges and trading venues to collaborate and execute a new form of trading "Cross Asset Trading" across time zones. The computer clusters built on FaST model using CCC-devices provide infrastructure reduction (i.e. reduces the foot-print of the data centers as single CCC-Device which consists of 700-1500 cores can replace bulky computing racks built using Xeon cores and OS), thereby reducing the capital expense ("CAPEX") and operating expense ("OPEX").

Still another aspect of the invention is the modified FPGA's built using CCC-Technology, which truly makes FPGA perform as General Purpose processors and not like co-processors assisting general-purpose processors. CCC Technology based FaST model of computing connects seamlessly all the departments or cost-centers of any corporation and can provide real-time Enterprise Risk Management. CCC Technology based FaST model of computing connect and synchronize geographically distributed live databases in real-time. This enables more realistic assessment of business situations and realistic decision-making.

Still another aspect of the invention is CCC-Technology's Device Polymorphism of devices, which increases Business Process Management of any corporation (e.g., interconnecting two trading exchanges to have Straight Through Processing of buying, selling, clearances and setting in real-time without any geography boundaries distance limitations).

BRIEF DESCRIPTION OF THE DRAWINGS

For a more complete understanding of the present invention, reference is made to the following detailed description of an embodiment considered in conjunction with the accompanying drawings, in which.

DETAILED DESCRIPTION OF THE INVENTION

The following disclosure is presented to provide an illustration of the general principles of the present invention and is not meant to limit, in any way, the inventive concepts contained herein. Moreover, the particular features described in this section can be used in combination with the other described features in each of the multitude of possible permutations and combinations contained herein.

All terms defined herein should be afforded their broadest possible interpretation, including any implied meanings as dictated by a reading of the specification as well as any words that a person having skill in the art and/or a dictionary, treatise, or similar authority would assign particular meaning.

Further, it should be noted that, as recited in the specification and in the claims appended herein, the singular forms 'a,' "an," and "the" include the plural referents unless otherwise stated. Additionally, the terms "comprises" and "comprising" when used herein specify that certain features are present in that embodiment, however, this phrase should not be interpreted to preclude the presence or additional of additional steps, operations, features, components, and/or groups thereof.

In this disclosure, the term "metal" is defined as relating to the semi-conductor level, or chip level, of computer hardware. More particularly, the term "metal" emphasizes extreme low latency for communications and high performance for computing.

The present disclosure relates to a compute-communicate-continuum ("CCC") technology in which the idea of computability is intimately connected with the nature of Time, relevance of space-time theory seems to be unquestionable. If processing cores form on X-axis and Memory on Y-axis the communications become Z-axis and Time/Geography (as per Einstein's theory there is no difference between space and time) providing the 4th dimension thus producing 4D computers wherein the communications becomes not only fundamental but also integral part of the architecture of the computers.

Figure 1:
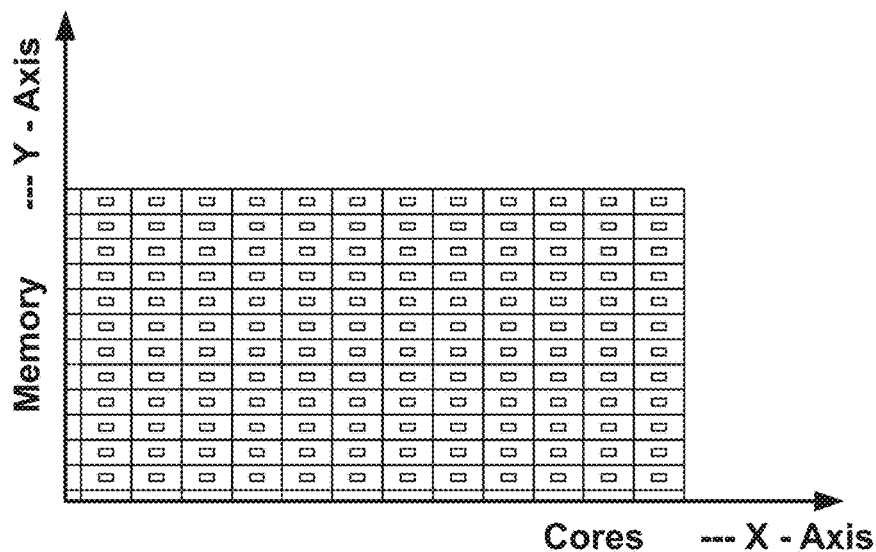
FIG. 1 is a diagram of a computer architecture, where processing cores form on the x-axis and memory is on the y-axis.
Figure 2:
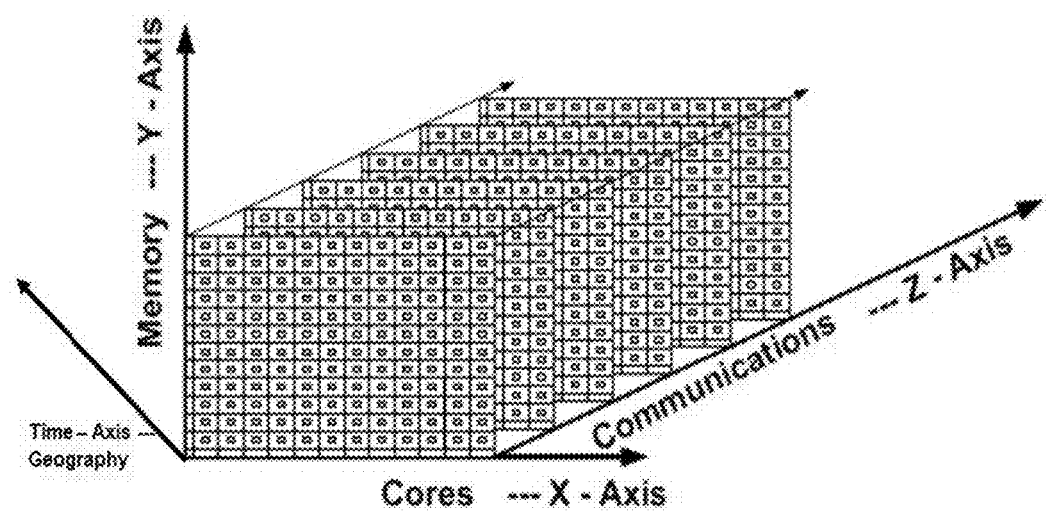
FIG. 2 is a diagram of the computer architecture shown in FIG. 1 constructed in accordance with an embodiment of the present invention.

As seen in FIG. 1, in today's computer architecture, if processing cores form on the X-axis and Memory on the Y-axis, the computers built on these axes are 2D computers, which require a communications set-up externally that may be with NIC cards or a unifying OS across two such computers. By contrast, as seen in FIG. 2, in the CCC paradigm, if processing cores form on the X-axis and Memory on the Y-axis, the communications become the Z-axis, and geography/space (Time) become 4th dimension thereby presenting 4-dimensional computers wherein the communications becomes not only a fundamental but also an integral part of the computer's architecture. Such uniquely designed compute-communicate devices using CCC technology become polymorphic, as they act as both communications and computing devices. Such devices must be easily programmable on multi-core as they are built with thousands of cores. Hence with systemic determinism, this technology leads to the distributed parallel computing relativistic in nature, wherein it gives raise to the principle to imagine computers in plurality in a sense multiple computers as a single device. The inventors coined the name of this driving principle of Compute-Communicate Continuum technology as Relativity Computing as opposed to Quantum Computing.

Achieving Relativity Computing means such uniquely designed compute-communicate devices using CCC technology will not have any difference between space (Memory/Cores/Geography) and Time (latency) produces Relativity Computing making any geographically distributed compute nodes as one single big computing system. Devices built on CCC technology become polymorphic acting both communications and computing devices. They must be easily programmable on multi-core as they are built with thousands of cores.

The multi-core CCC-Devices built on CCC technology can be seamlessly interconnected to form an extendable multi-device fabric consisting of High Performance Embedded Compute nodes to act as one computer. Thus, in a CCC fabric, though they are multiple in number, the computing nodes act as one single system by sharing memory and their multi-core compute nodes.

The CCC-Devices in this fabric are interconnected by a "Metal Shared Memory Interconnects" (MSMI) protocol, which is a light-weight extreme low latency (ELL) protocol based on shared memory long haul interconnects over wide area network (WAN) links. MSMI provides a scalable, low-latency, high bandwidth long haul interconnect with full support for cache coherence and can help scale an unlimited number of compute nodes/cores while still able to be programed for and achieve multi core parallel programming. All memory mapping is handled through the standard address translation tables in the memory management fully controlled on the metal, which allows all processors in a system connected with MSMI to address all long haul memory and all memory mapped I/O devices directly. Accordingly, MSMI scales without limits with the number of cores or with inter-core distances. Such a system of multi-core and multi-device fabric forms new technology called "Fabric as a System Technology," or FaST.

Now these clusters built over FaST fabrics enable high performance network Connectivity across WAN links help to run user specific large scale distributed processing on large/high frequency data sets (for instance widely distributed CCC devices can process and precisely estimate market data quantities including volatility, correlation and betas from multiple trading venues across times zones placed in the shared memory by market data feeds); easy implementation of synchronization/replication of distributed databases over large distances in near real-time on high frequency data; and/or a WAN-sized, efficient, shared storage system for historical market data analytics.

Compute-Communicate Continuum supercomputing technology increases computational power by creating high performance computational pipelines either on multi-core FPGAs or on conventional Xeon cores. In order to program/run any application on these CCC systems, CCC supercomputing streams a sequence of instructions to convert them into dynamic systolic arrays, which can run on these cores without any OS burden, at wire speeds and achieve supercomputing. The architectural design uses and applies a new form of parallelism on multi-core on FPGA silicon, i.e. specifically by configuring a single mid-sized FPGA into a 700+ processing many-core IC.

CCC Compute Model

Figure 3:
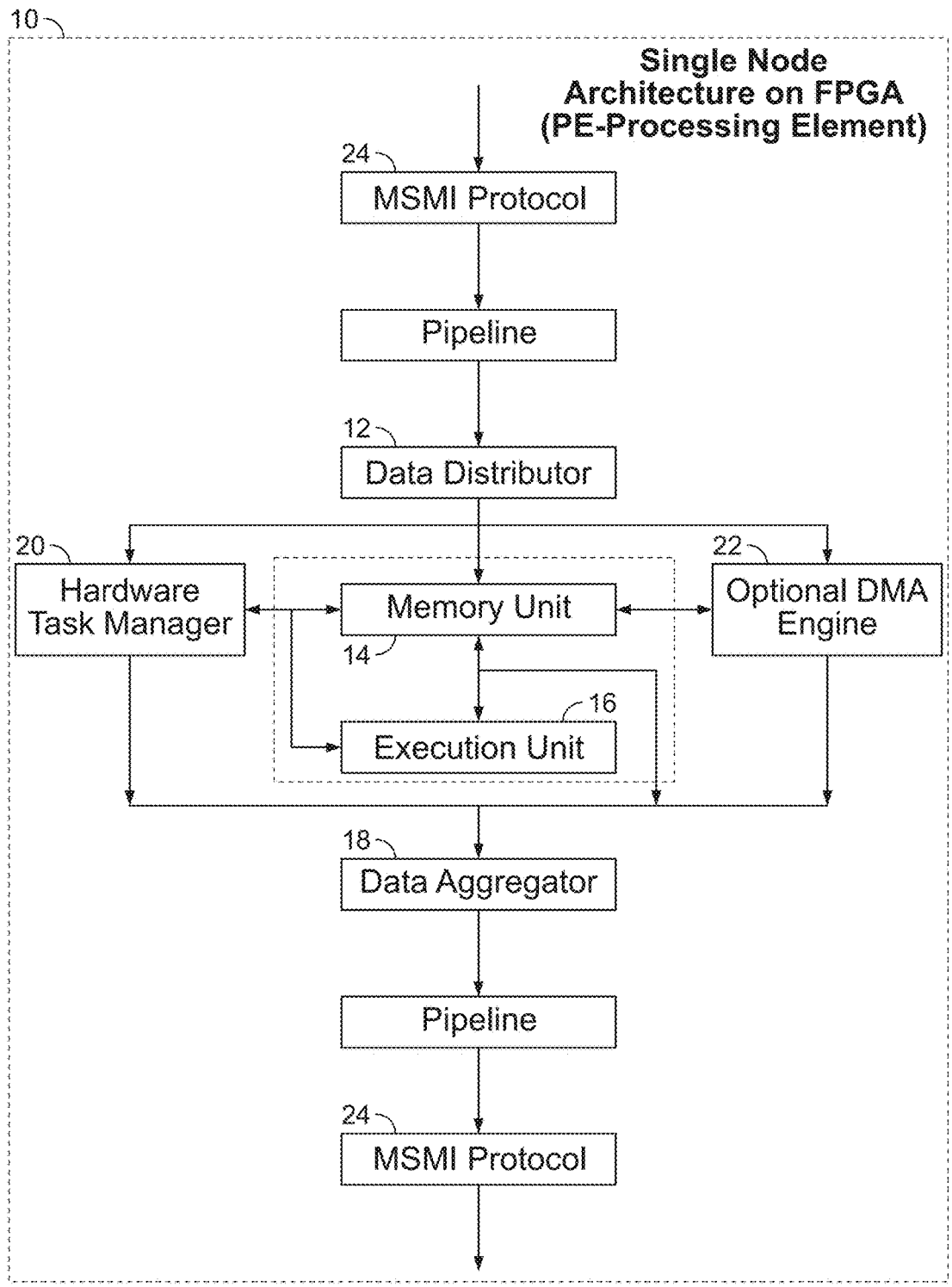
FIG. 3 is a diagram of a single node architecture of an embodiment of the present invention on FPGA.

As seen in FIG. 3, a complete processing core can be created on FPGA using the available programmable elements on the FPGA. In other words, by using some of the primitive units of gate arrays, flip-flops, memory, DSP, logic blocks and routing components, a CCC processing core can be configured using hardware programming language Verilog. The same process can be repeated to create a multiple number of CCC cores on the FPGA to include all primitive units available. Nearly 700- 1500 such cores can be replicated on one FPGA.

The bit map files for a processing core 3 can be reused on all other FPGAs to create the similar cores, a process known as "tinkering" or "cloning" the FPGA. Using hardware primitives such as programmable logic arrays available on the FPGA, a block small Data Distributer 12, a local memory unit 14 of 4K memory with 1K cache, an execution unit 16 by using Logic Blocks, and a Data aggregator 18, all of which can be created using Verilog. A Task manager 20 to pass the execution instructions and an optional DMA engine 22 to bypass and read memory from the I/O interface (not shown) can also be created.

Figure 8:
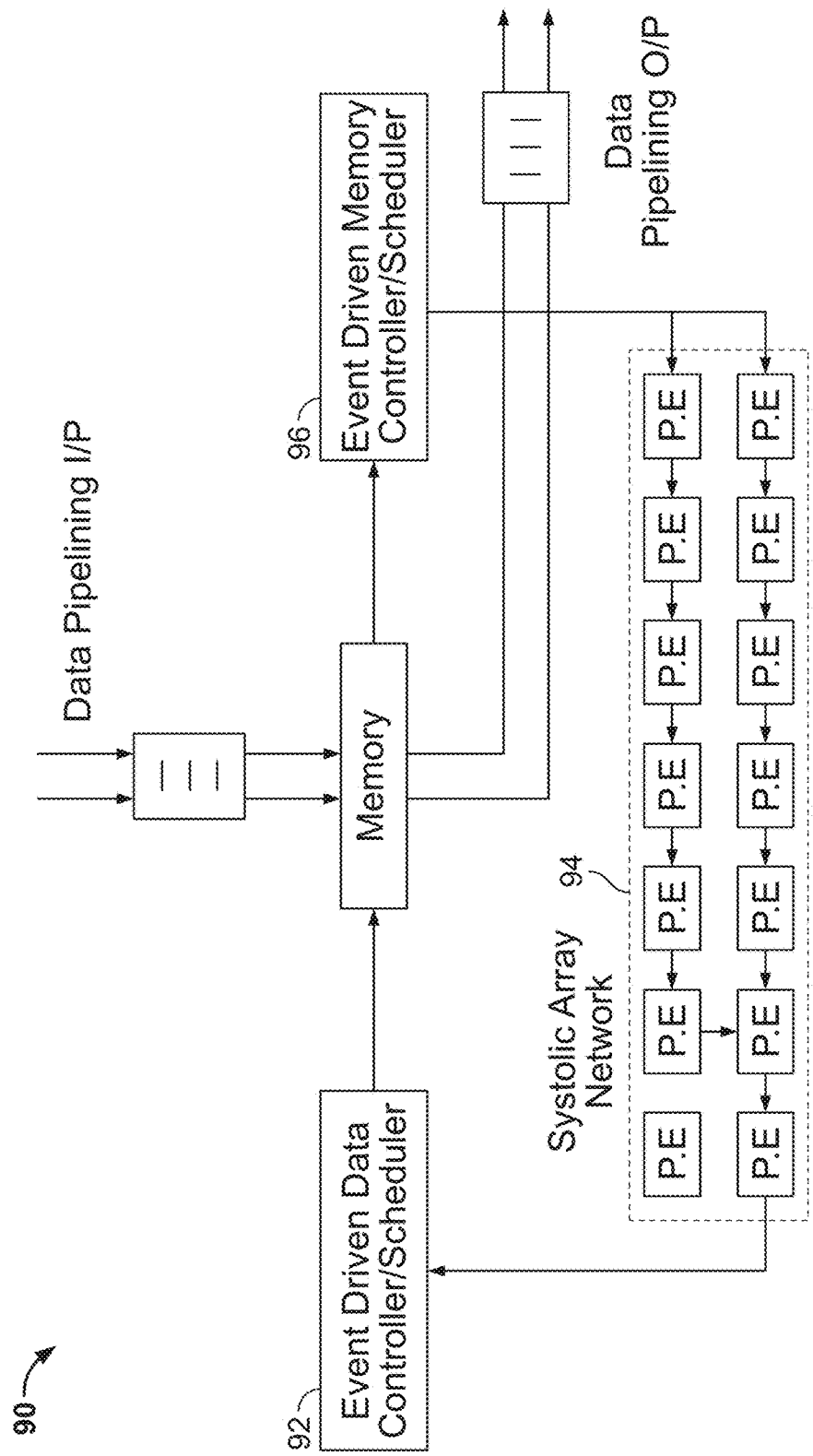
FIG. 8 is a diagram illustrating the logical mapping of a systolic array network on a plurality of CCC-enabled cores, such as those shown in FIG. 7.

When any program logic's Systolic array cell 10 is mapped onto this "Composite Core" as in FIG. 8, the Task Manager 20 reads the instructions provided in the systolic array and the data provided from the cell are executed in the execution unit 16. The data reading and instruction passing through the I/O ports are fully controlled by MSMI protocol 24 whose complete architectural design is described in the "CCC-Communications Model" section. With this design, a full-blown reconfigurable compute-communicate processing core 10 is created on any FPGA.

Figure 4:
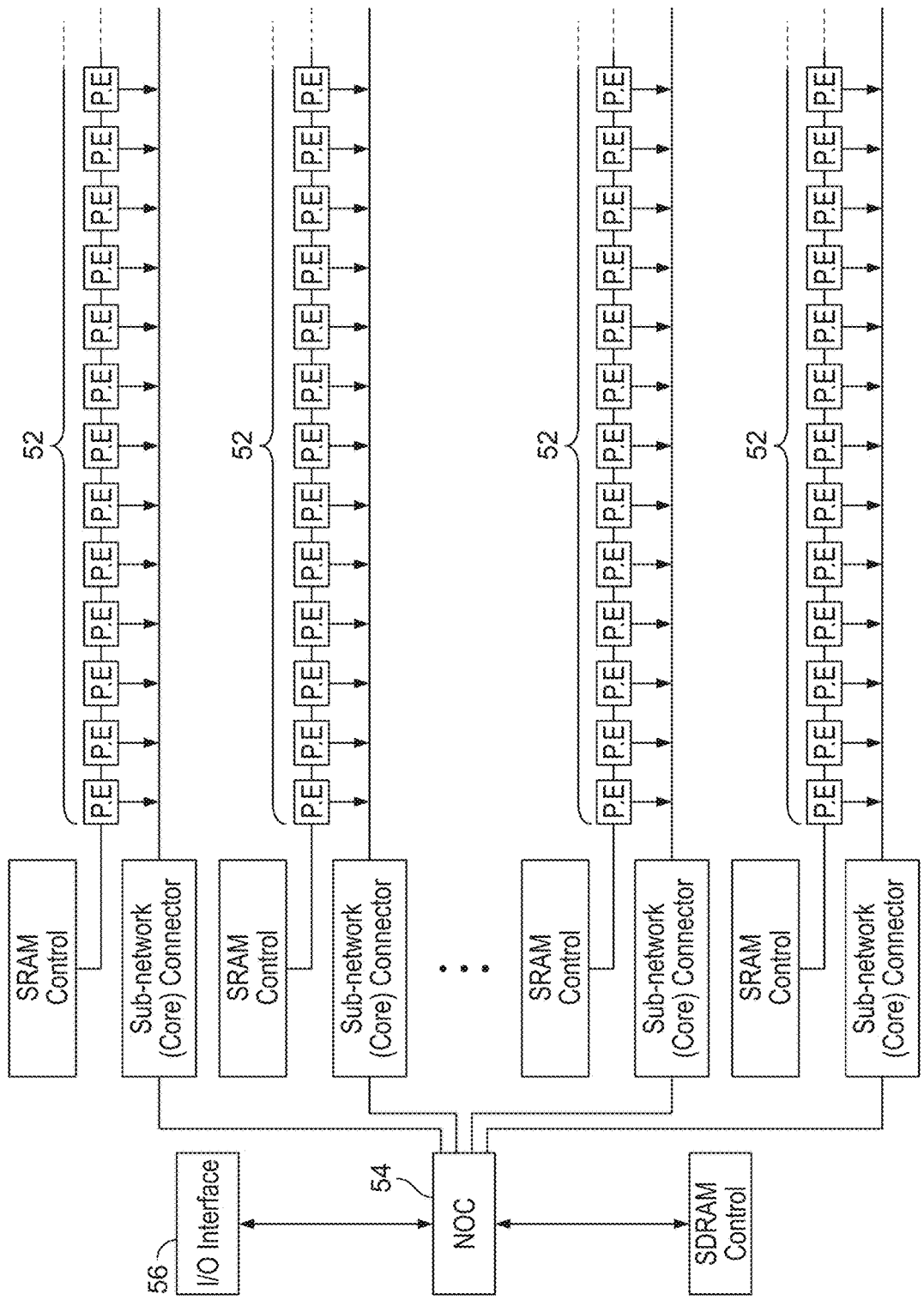
FIG. 4 is a diagram of interconnected cores created on FPGA using Network on Chip ("NoC") technology in accordance with an embodiment of the present invention.

As shown in FIG. 4, the CCC-Compute-Communicate cores created on the FPGA are to be connected for controlling, addressing and assigning them to the Systolic Array cells or processing elements ("PEs") 52 and they are capable of executing few instructions individually. This forms basic infrastructure to configure systolic array cells 52 onto the CCC cores in FPGA to form Systolic array networks. The Network on Chip (NoC) 54 connects all these cores and their memory and has the address of each CCC core. It also controls the data traffic physically between core-to-core, core to memory and memory to I/O 56 on the FPGA, whereas the Systolic array cells mapped on these cores drives the data logically between core-to-core, core-to-memory and memory-to-I/O 56. The design of the NoC 54 also takes care of the bandwidth bottlenecks and oversees the smooth flow of data between core-to-core, core-to-memory and memory-to-I/Os.

Figure 5:
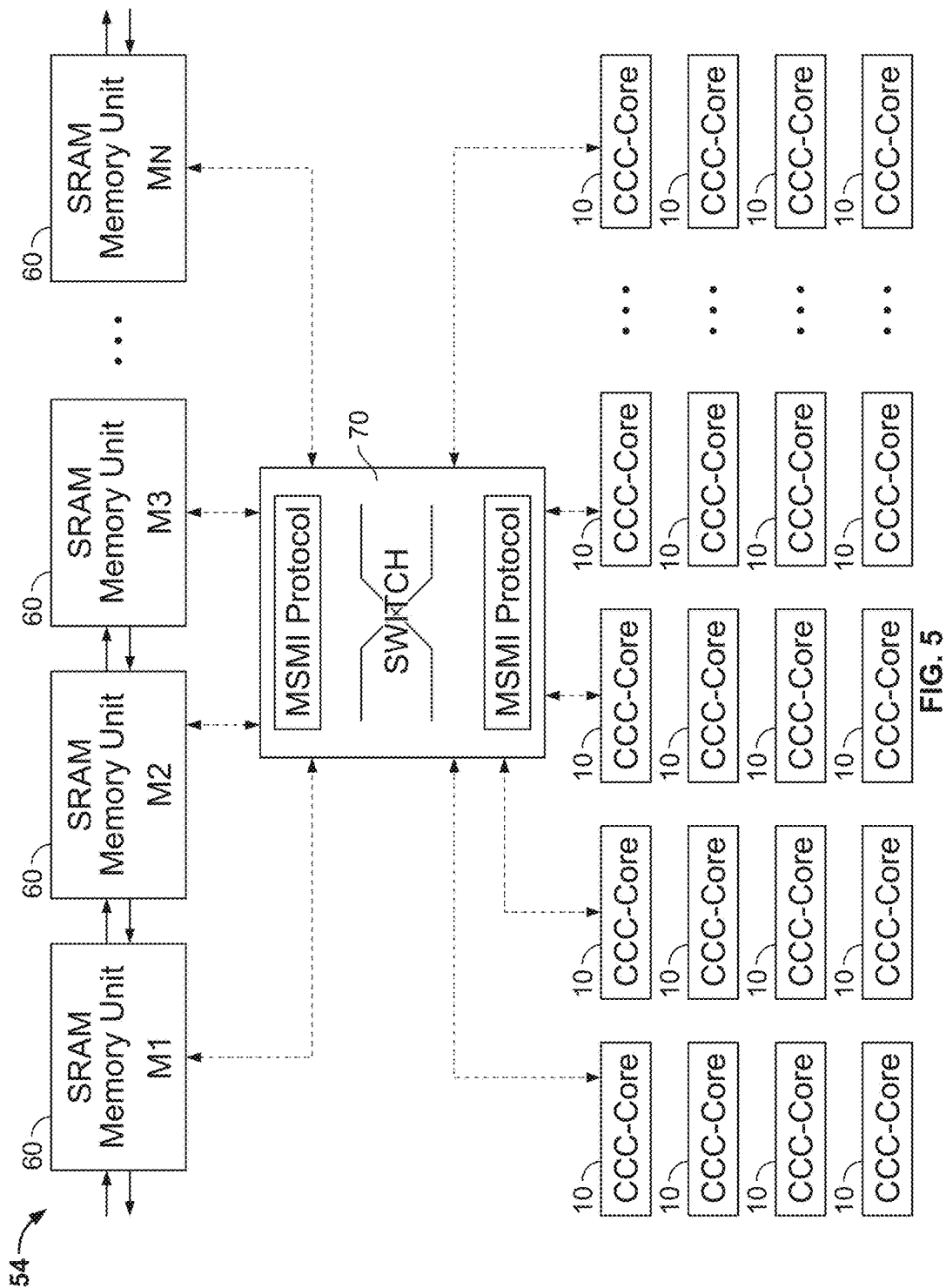
FIG. 5 is a diagram of a physical CCC-NOC architecture.

FIG. 5 shows an example of the physical architecture of the CCC-NoC 54. The architecture of the NOC 54 has to take care of both interconnecting of the CCC metal cores 10, which can be between 700-1500 in number, and also providing the bandwidth requirement of the data traffic between the cores 10 and the Shared Memory 60 that they all transmit (write)/receive (read) data. To ensure real-time processing, the architecture of the NoC 54 provides low latency high bandwidth data communications between the CCC cores 10 and the Shared Memory blocks 60. All the data communications between the processors are driven by the self-steering Systolic array networks which are mapped on to these CCC cores 10, resulting in the same data being transferred to many such systolic networks (i.e. One to Many transactions to multiple such systolic networks). A right interconnect topology (Mesh/Ring/Star) can be chosen among the CCC cores 10 for fast data communications. The data from many Systolic Networks can be moving to one Systolic network resulting in Many to One transactions (i.e. aggregation of data). There can be many multi-clock frequency issues when the data is being transferred from many primitive FPGA blocks such as Memory to CCC cores, Memory to Memory (i.e., direct memory access, or "DMA") and to CCC cores to CCC cores.

Figure 6:
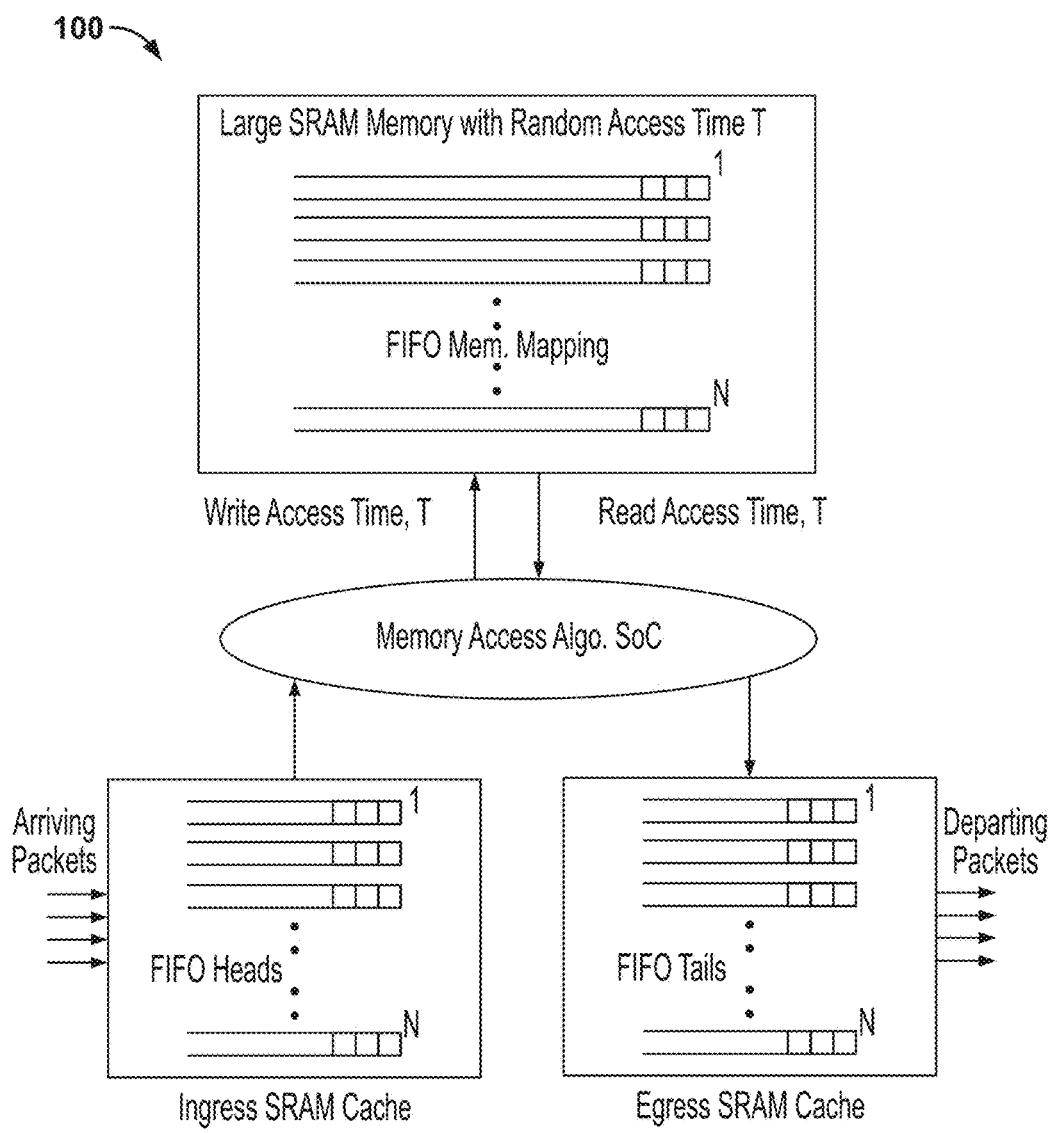
FIG. 6 is a diagram of a CCC-NOC shared memory switch architecture.

FIG. 6 shows the operation 100 of a CCC-NoC Shared Memory switch 70 in accordance with an embodiment of the present invention. As seen in FIG. 5, the architecture of the switch 70 is based on high speed Shared Memory to interconnect the CCC-Cores 10 with the Shared Memory Banks 60, which are SRAM based. The design of the switch 70 emphasizes much on the synchronization of packets of memory arriving rate and the memory access delays. The switch traffic is driven by the MSMI protocol, which converts memory locations based CAS/RAS into CCC-packets and if the location of the Shared memory remote it creates required no. of flows and does memory to memory transfers. Referring to FIG. 6, when a packet arrives, it is immediately placed in a queue that is dedicated to its outgoing port, where it will wait for its turn to depart. As the NoC is local to any FPGA, the local packetization of the memory is not required and directly transfers to the memory's using direct memory access ("DMA").

Figure 7:
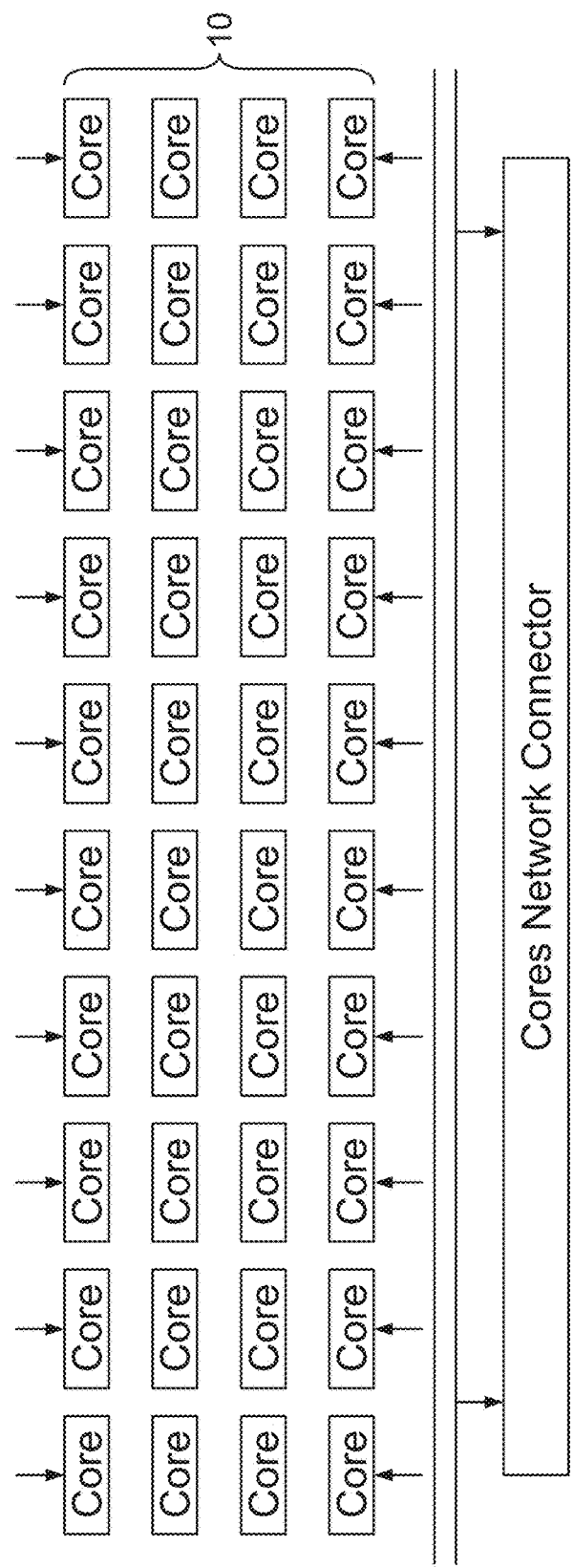
FIG. 7 is a diagram of a plurality of interconnected cores on FPGA.

FIG. 7 illustrates how a sea 80 of interconnected CCC cores 10 can be created, where several FPGA's interconnected in a particular topology results in thousands of cores. The number of cores created on the FPGA is connected to access them. Systolic array cells are configured on these CCC cores 10 on FPGA to form Systolic array networks. The mapped systolic array cells on CCC cores 10 drive the data and the instructions for computing and communications at the native clock rate of the FPGA. The data interface from I/O 56 to local memory of the CCC core 10 is like a DMA device.

Figure 22:
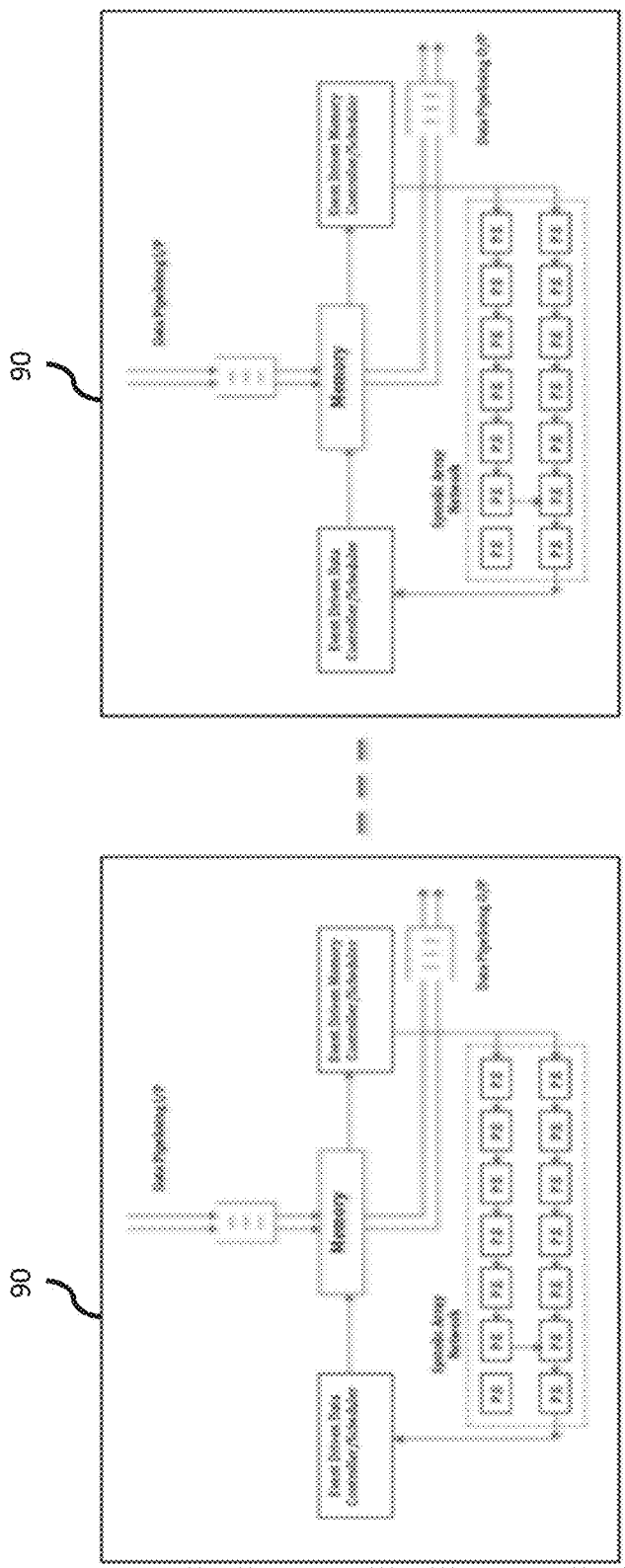
FIG. 22 is a diagram illustrating multiple networks of systolic arrays shown in FIG. 10 working in accordance with an embodiment of the present invention.

As per CCC-Programming paradigm, any program logic sequence of instructions can be converted to dynamic systolic array networks, which can run on these CCC-cores at wire speeds. A typical systolic array network can be mapped as one set of instructions executing as one unit. FIG. 8 illustrates a logical mapping of a systolic array 90 on the CCC-cores 10, where several systolic array processing elements 52 are interacting logically on physically connected CCC-cores. The "Event Driven Data controller/scheduler" 92 orchestrates the I/O operation of the systolic network 94 with other systolic networks. All activities such as writing/reading the data from I/O on to the shared memory area are controlled by "Event Driven Memory controller/scheduler" 96 using MSMI protocol. In the same manner, as shown in FIG. 22, several such dynamic systolic array networks 94 will be working and CCC-cores at any particular time completing the program logic to run at wire speeds, thereby providing super-computing. Multiple networks of systolic arrays of an application become systolic processors with computing pipelines.

Figure 9:
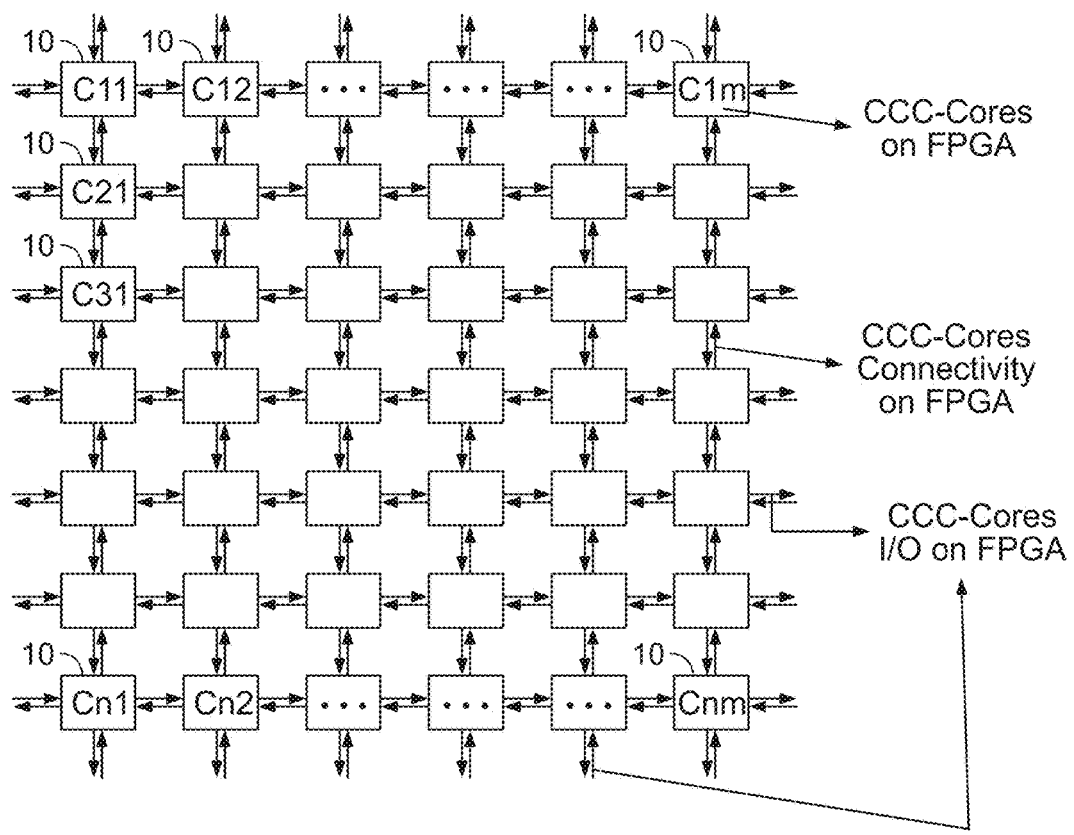
FIG. 9 is a diagram showing the physical connectivity between the CCC cores on the modified FPGA.
Figure 10:
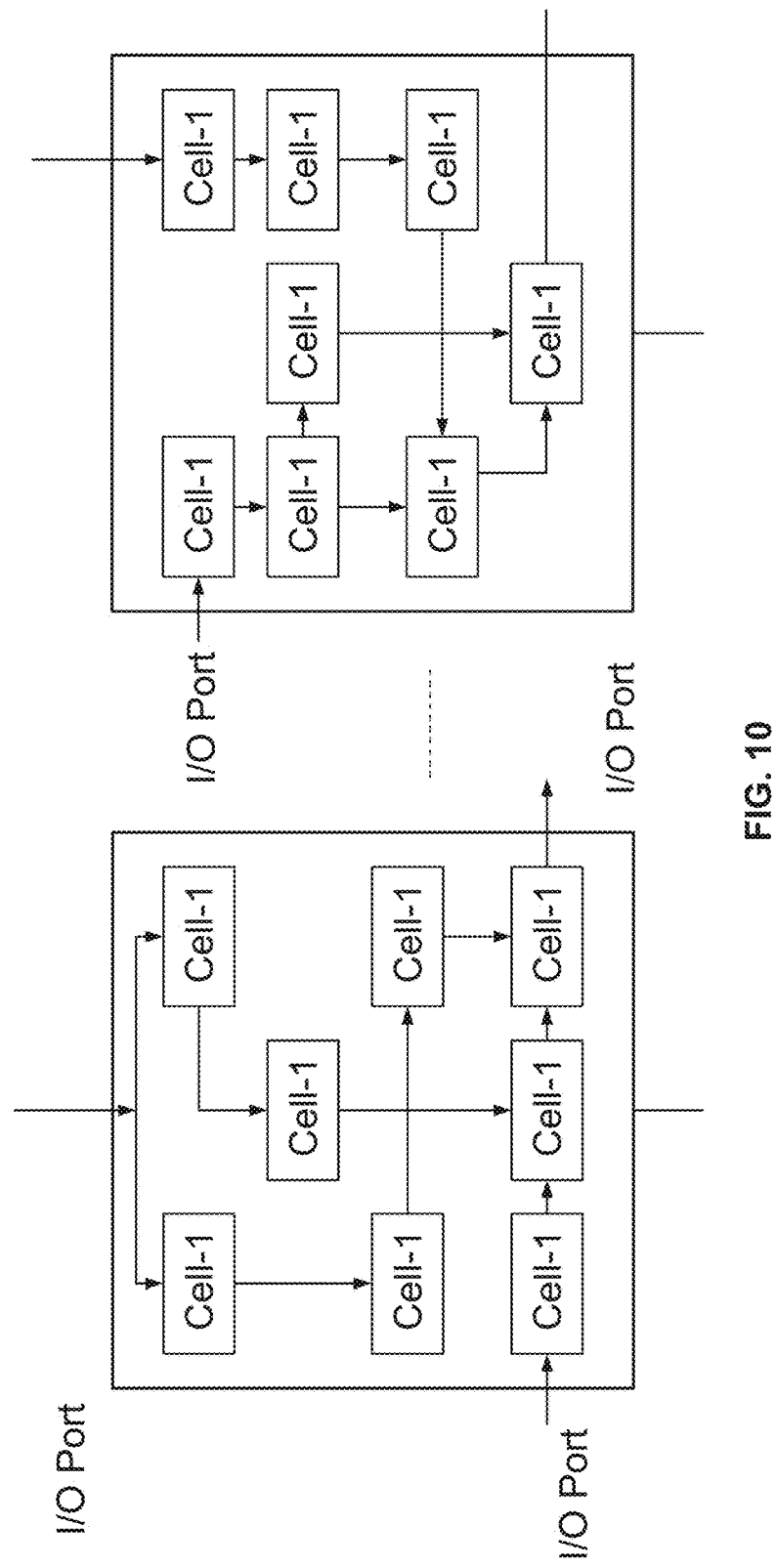
FIG. 10 is a diagram illustrating a typical network of systolic arrays.

FIG. 9 shows the physical connectivity between the CCC-cores 10 on the modified FPGA. Dynamic systolic array networks are mapped on top of these physically connected cores 10, thereby connecting these cores logically. A typical network of systolic array is shown in FIG. 10. The CCC Programming model converts any program's sequence of instructions into dynamic systolic arrays that are connected logically, which can then be mapped on the cores 10 shown in FIG. 9. The logical connectivity can be between any two cores on these physically connected cores 10 and is established by MSMI protocol.

Figure 23:
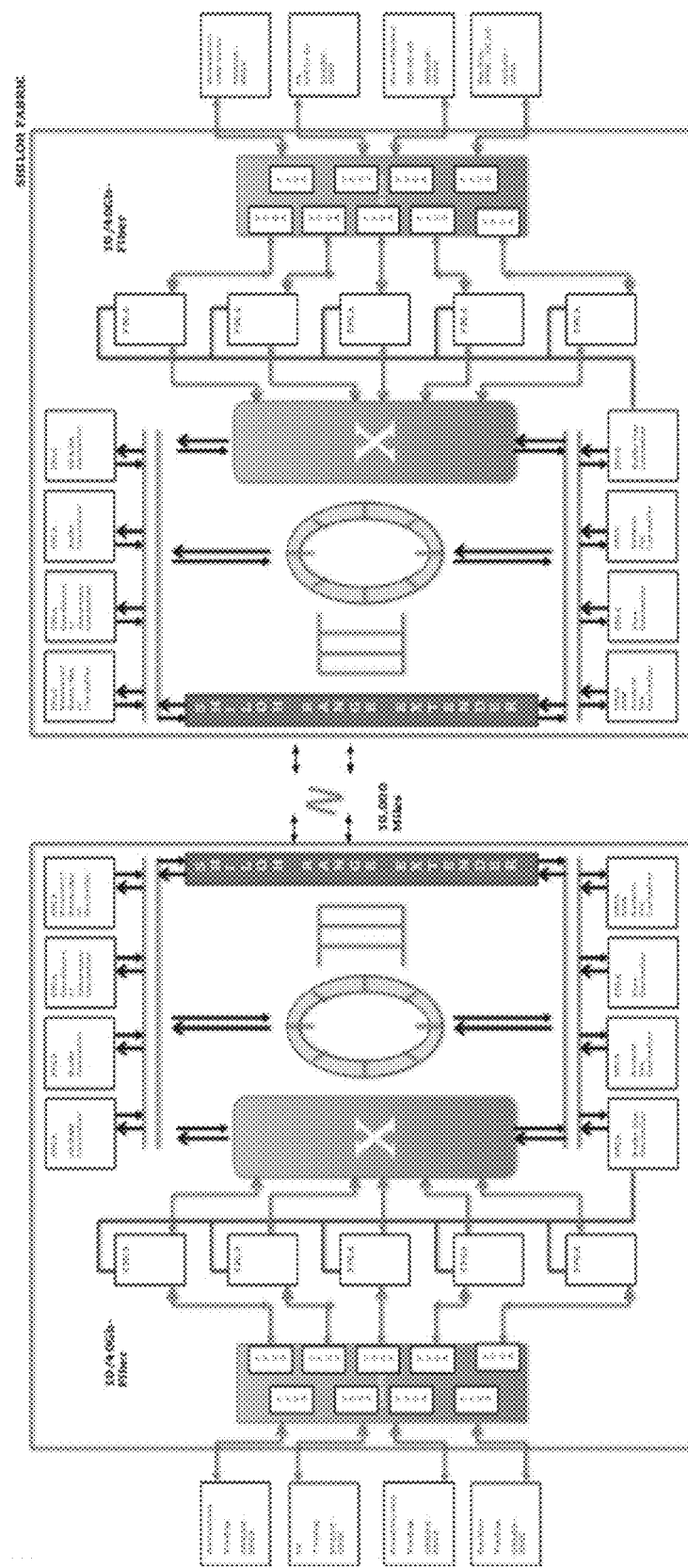
FIG. 23 is a diagram illustrating a topology of FPGAs to form a CCC-Device in accordance with an embodiment of the present invention.

FIG. 23 illustrates a topology of FPGAs to form a CCC-Device. As discussed above, CCC-cores can be created and replicated on FPGA, connecting them with a corresponding number of SRAM based memory banks with the CCC-NoC, as seen in FIGS. 4 and 5. Such modified FPGAs can be interconnected in a particular topology dedicating each of them for specific functions (SoCs), such as computing and communication activities (e.g., flow controller, DSM controller, Systolic array mapping on to CCC cores, etc.). Such topologies of FPGAs can be formed together as a CCC-Device with I/O interface to a gateway, storage, DB etc. A driver S/W SoC can program these cores on FPGA by creating Dynamic Systolic array networks on them. These devices can be geographically distributed and remain connected, forming a fabric of CCC-Devices which can be seamlessly connected acting as one system as though they are multiple in number.

CCC Communications Model

Key to addressing the communications challenges in CCC technology is the use of Metal Shared Memory Interconnects (MSMI). MSMI provides communications between memories, cores, and between memory and cores.

Currently existing shared memory interconnects work well within short distances but become less effective over long distances between memories. Today's shared memory interconnects solutions for long distances suffer due to the legacy protocol TCP/IP based communications over WAN links. By contrast, all tasks on one CCC appliance can access all memory and 10 resources of other configured CCC appliances in a fabric of CCC appliances.

The MSMI protocol supports large size packet transfers and parallel communication streams to improve the bandwidth utilization of the WAN link significantly. The MSMI protocol supports WAN distances of up to 20,000 miles to create high performance CCC fabric architectures. With MSMI protocol, a wide area high performance implementation of a fabric as a system with multiple distributed interconnected computing nodes, called "Fabric as System Technology" (FaST), can be achieved.

The MSMI concept is to introduce two CCC-Devices, one at either end of any trunk running MSMI metal algorithms. When CCC-Devices deployed in FaST fabric, any two devices are programmed to feel as if they were next to each other relativistically, even though the distances between them may be thousands of miles. The two CCC-Devices are connected at either end of a trunk, where MSMI passes all non-MSMI traffic unchanged but accelerates the MSMI data/memory transfers to the highest rate feasible on the trunk, subject to the source and destination computers capability.

Comparing MSMI with TCP protocol, TCP flows are rate limited by the round trip delay over their path so as to typically limit the transfer rate to 35-95 Mbps. With the CCC-Devices installed on a 1 Gbps trunk a single TCP flow can be accelerated to 950 Mbps and on a 10 Gbps trunk to between 3.5 Gbps to 9.5 Gbps thus providing acceleration of 10:1 for 1 Gbps trunks and up to 100:1 for 10 Gbps trunks. The CCC-Devices which are interconnected with MSMI protocol are also constantly monitor the total trunk utilization and thus ensure that the total utilization does not exceed the trunk capacity by rapidly adjusting all MSMI traffic, thereby protecting the switches or routers at either end from overload. This insures that there is minimal to no packet loss or synchronization, thus raising the trunk utilization to 95% rather than the typical maximum of 50%. This avoids the addition of a second trunk to improve throughput, resulting in major cost savings even after adding the CCC-Devices.

As discussed above, CCC-Cores have their own individual memories, cache and I/O. Each core's I/O is embedded with the MSMI protocol code. The MSMI protocol is lightweight and not hardwired, but fully reconfigurable. This makes each CCC-core both a computing element and a communications element. The systolic arrays that are mapped on these cores drive the data movement from a core's individual memory to I/O, from one I/O of the core to another I/O of another core, or onto another memory that can be a Centralized Shared Memory buffer.

When data at different I/O ports of the cores or memory is to be sent, such data is written onto a centralized shared buffer memory with MSMI protocol. When the time arrives for this data to be received and processed, the data is read from this shared buffer memory by MSMI protocol and sent to the I/O of the cores by the systolic array cells mapped on these cores. This allows systolic cells to communicate and synchronize without any header information overheads. This low level communication makes it possible for the systolic cells to increase their computing power for parallel processing. Data from I/O ports will be used as they arrive and need not always be buffered in the systolic cell's local memory unless it is required by the computation. Frequent access to the local memory typically reduces the cell's performance and the reduced access to local memory access translates into increased computation performance. Thus, every cell of a systolic array accesses the MSMI protocol bit map and does I/O transmissions with other cells, making them not only processing but also communication elements.

Typical full-blown program logic may constitute several networks of the Systolic Arrays. These networks may require more CCC-cores than available on a single FPGA. Because of this the systolic array networks are mapped on to several FPGA's CCC-cores. At times these FPGA's can be locally connected with in a CCC-Device or in another device, which may be thousands of miles away. When the MSMI is used for communicating across the CCC-Devices that are thousands of miles apart, it uses Packetization, Flow controlling and Ack-processing for low latency and high throughput data transmission, as discussed further below.

As used herein, "local communication" refers to the communication between the two cells that are mapped on to the two cores that are on the same FPGA.

As used herein, "global communication" refers to when two Systolic cells are mapped onto two CCC-cores, which are on two different FPGA cores, or when any two cores that are on two different CCC-Devices whose Shared Memory is mapped across the CCC devices.

As used herein, a "packet" refers to a memory element, which can be addressed by its CAS/RAS and can be framed to have header/address and data by the MSMI protocol.

As used herein, "Flow Block" refers to when there is an access to the shared memory across two CCC-Devices a physical transfer of "memory contents"/data between two memory pools takes place. The memory transfer is based on memory address to memory address, and the source address and destination address forms a Flow Block. Several blocks of memory of a pool can be transferred as multiple Flows through MSMI protocol.

As used herein, "Packet Block" refers to the memory content of one memory block's row of RAS, which can be sent in small packets in one Flow Block. In the same way several rows of a memory block (RAS) can be packetized into multiple packets by "Packet Controller"(PC). Each Flow Block will have its own Packet Blocks of such packets. For example, if the memory pool has 1000 RAS/CAS (Column/Row Address Strob) then if the 100 CAS column access memory elements can be sent in the first write they form a Packet Block of the same Flow Block and the next 100 can be next Packet Block of the same Flow Block. Accordingly, each Flow Block will have several Packet Blocks attached to it.

As used herein, the "CCC-Ack process" takes care to resend the packets from Flow Block/Packet Block if they are not reached the destination address correctly.

For local communications, MSMI protocol allows systolic cells to communicate and synchronize without any header information overheads. This low level communication makes it possible for the systolic cells increase their compute power for parallel processing. For global communications, MSMI protocol allows systolic cells to communicate and synchronize across WAN links with packetization i.e. header/address and data information and with full flow controlling by establishing up to 25M flows.

When an access to the centralized shared memory happens on from remote CCC-Device, a physical transfer of "memory contents"/data between two memory pools takes place on the CCC Devices. All transfers of memory contents are packetized with unit memory elements where a unit memory element is addressed by its CAS/RAS. These memory elements are framed as packets with header, address and data indicators by the MSMI protocol.

All packets having same memory pool's source and destination address form one Flow Block. These Flow Blocks will have several Packet Blocks of Packets on each Flow Block. This establishes flow controlling for CCC-Ack-Processing to make sure zero packet drops during their flight in WAN links. On a WAN link, several (~25M) such Flow Block chains will be established between any two CCC Devices, providing tremendous amount of super computing power.

Figure 11:
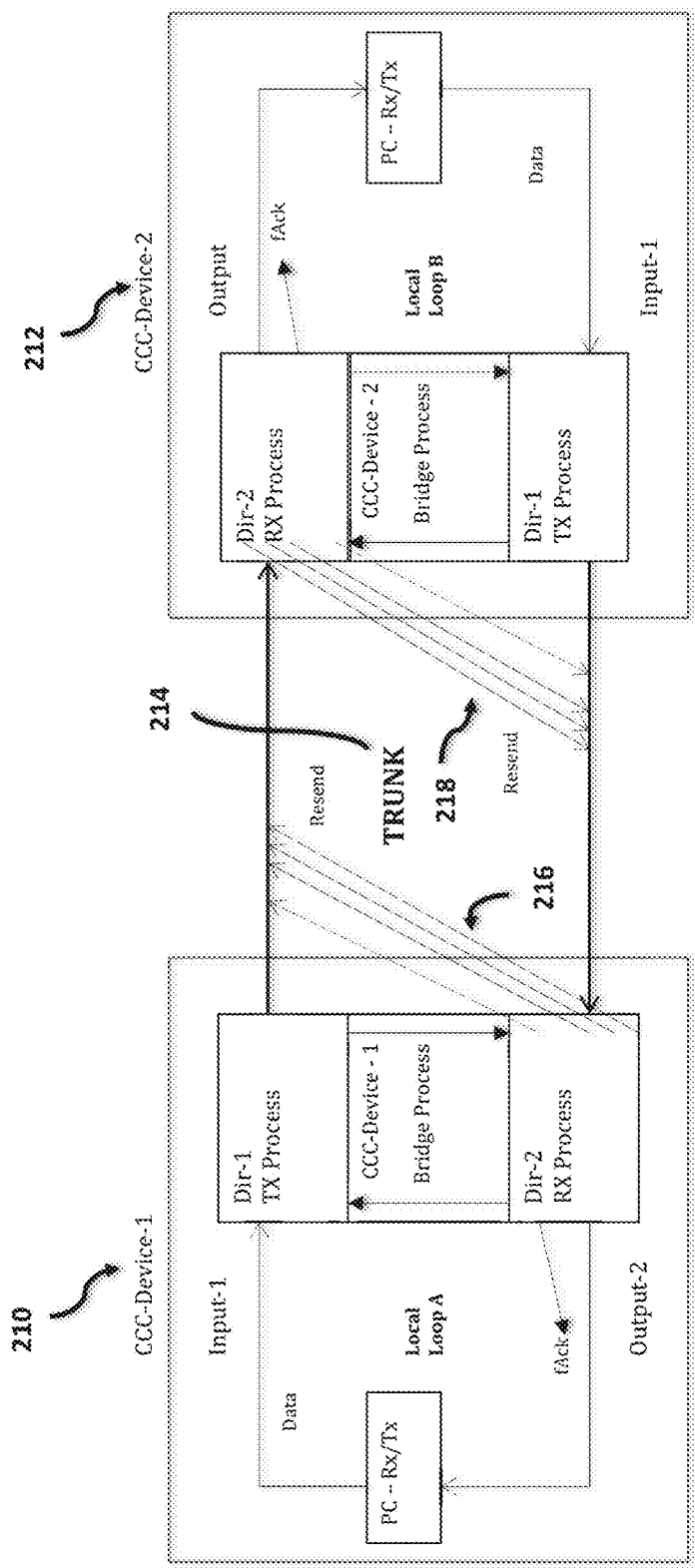
FIG. 11 is a diagram illustrating two CCC devices connected by a trunk and operating under an MSMI protocol in accordance with an embodiment of the present invention, illustrating a bi-directional traffic-control architecture between two CCC-enabled devices.

FIG. 11 illustrates how the MSMI protocol performs over long distance communications. As shown in FIG. 11, the MSMI long distance communication requires two CCC- Devices 210 and 212, which are at either end of a fiber trunk 212. The trunk 212 has a Round Trip Time ("RTT") of TRNK seconds.

Figure 12:
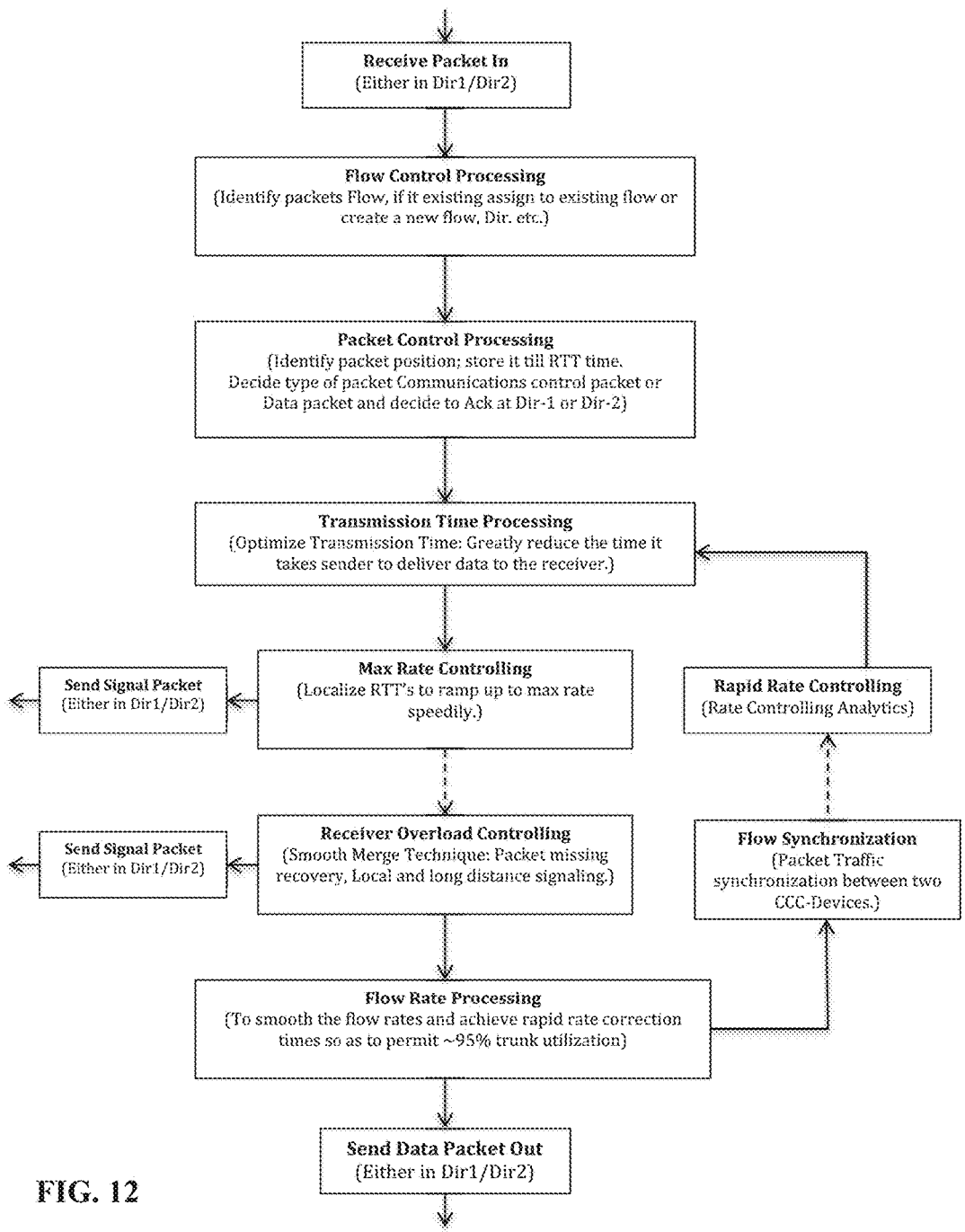
FIG. 12 is a flow chart showing how two CCC-devices connected by a trunk communicate over long distances under an MSMI protocol in accordance with an embodiment of the present invention.
Figure 13:
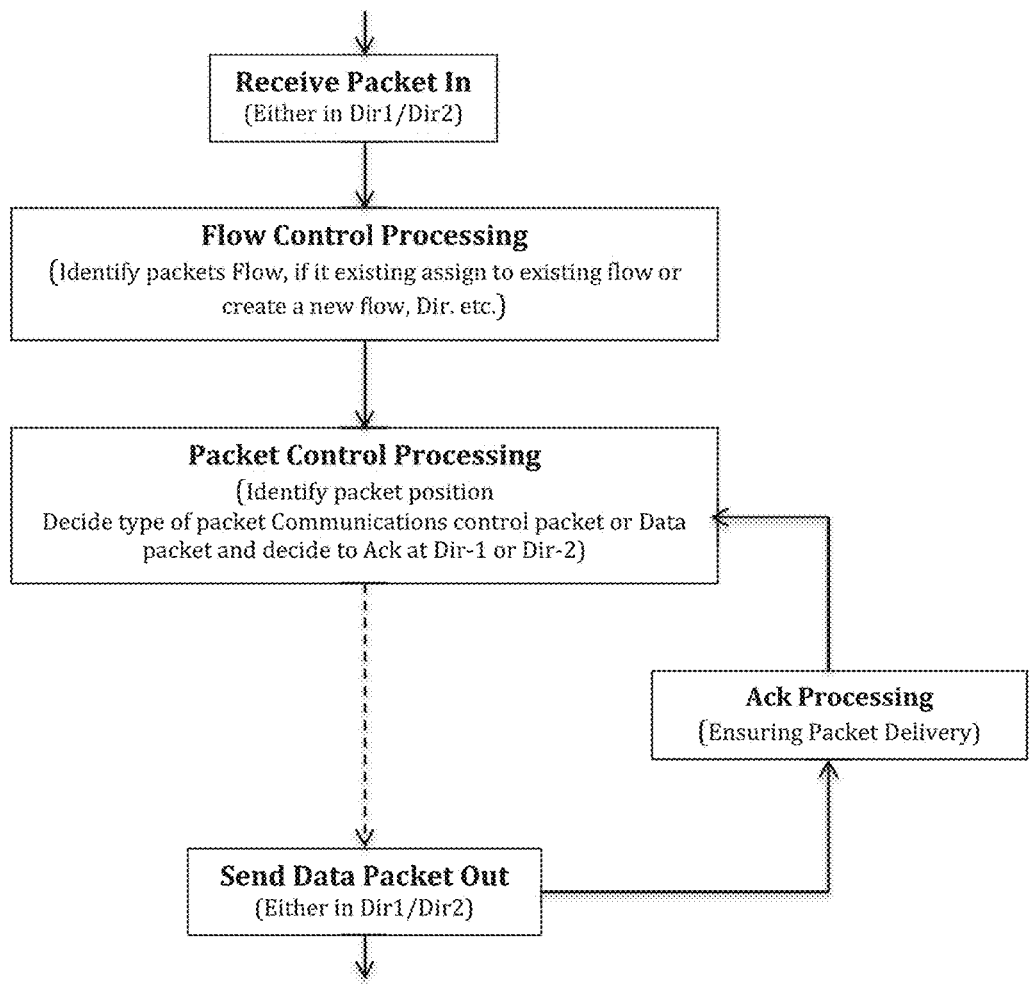
FIG. 13 is a flow chart showing how an MSMI protocol operates across CCC-cores or FPGAs within a CCC-device in accordance with an embodiment of the present invention.

In each of the CCC-Devices 210, 212 there are two major processes: one for packets (pkts) originating from inside, called Direction 1 (Dir1); and one for packets entering from the trunk into the CCC-Device, called Direction 2 (Dir2). The sending device's packet controller ("PC"; shown inside CCC-Device 210) and the receiving device's packet controller ("PC"; shown inside CCC-Device 212) can each reverse (Transmit-TX/Receive-RX) at any moment with their own flows (i.e., packet streams with the same ID). The packet controller of one CCC-Device 210 makes memory locations as packets to be sent to another CCC-Device 212. A flow ID for MSMI traffic is having the same memory block addresses and ports. To identify a flow, the addresses are hashed and ported into one 64 bit number. The diagonal lines 216 and 218 shown in FIG. 11 are CCC-D constructed traffic of three types: Signaling packets (SigPkts); fAcks (which are fake Acks) generated by the CCC-Device; or retransmissions of lost packets. Sigpkts convey information between the two CCC-Devices 210, 212 about a flows local loop rate, local loop delay, packets sent, and error information. FIGS. 12 and 13 illustrate this process.

To greatly reduce the time it takes a sender to deliver data to a receiver, one must greatly increase the operating rate of the flow while reducing the time to get to the operating rate. MSMI can achieve much higher rates if the RTT between it and a receiver which acks its packets is very small. This is achieved if the two local loops (Shown in FIG. 11) are short with low RTTs and the CCC-Ds can somehow maintain this high speed across the trunk. Until the trunk saturates, the rate will be limited by the longer local loop. As the local loop inside the CCC-Device, its local loop RTT will be very low and the user's local loop at the other end will be the controlling factor. The maximum rate of his connection and its distance will control the max transfer rate, not the trunk (or trunks) or the CCC-Device's local loop or its clock speed.

If both local loops in CCC-Devices are connected at 10 Gbps, then their Max Rate will be determined by the Trunk load with a maximum for a 10 Gbps trunk of 8 Gbps. As trunks today are usually loaded to an average of 50% to avoid synchronization overload, if the CCC-D's also manages the flows to be smooth, not saw toothed, and manages their rates more rapidly to control the total load, safe utilization of ~95% can be achieved. This saves the cost of a second trunk and thus more than offsets the cost of the CCC-Devices, producing a major cost savings.

The low RTT for the sender CCC-Device allows a much faster rate increase ramp than TCP over the Trunk RTT. The gain is proportional to the Round Trip Times (RTT's). So if the Trunk is 10 ms long (RTT time) and the sender's local loop time is 1 ms long that is a 10:1 potential speedup. Cross-country would be 40:1. In most cases this is too fast and must be controlled to be somewhat slower but still the rise time to Max Rate will be much faster.

The rate is not reduced by distance except for the Local loop distance/time (processing time). Once packets are acknowledged by the 1st CCC-Device, it stores the copies if needed. The trunk itself has no switch or router to drop packets so there is no distance slowdown effect. The second CCC-Device keeps another copy of packets so that losses on the final local loop can be quickly resent. Thus, it is possible to quickly ramp up to the maximum sender rate and maintain that rate. If one is sending to a faster or equivalent CCC-Device the max rate of the sender is easy to achieve. For backups to a data center server this allows the sender's highest rate subject to trunk capacity.

As TCP operates today, it does a SYN and in a RTT receives a SYN-ACK to confirm. Then it sends two packets and in a RTT receives an ACK allowing it to send 4 packets. As long as no error occurs this continues to double the packets sent and thus the rate every RTT. When the net or the receiver overloads, a packet will be lost or delayed which signals the sender to cut the rate in half, change to a slower increase pace and keep this process up creating a saw tooth wave shape, one cycle every error. The constant feedback end-to-end helps limit overloading the receiver with too many packets too fast.

This limitation is missing for the dual CCC-Device system, as it could ramp up extremely fast with a low delay sender local loop well in advance of the receiver seeing any data packets. If the receiver or its local loop has a lower rate limit than the sender, this creates a problem where the overload could be thousands of packets too many, in way too short a time. In such circumstances, a new technique called "Smooth Merge" has been developed to make this work perfectly, even better than normal TCP.

Figure 14:
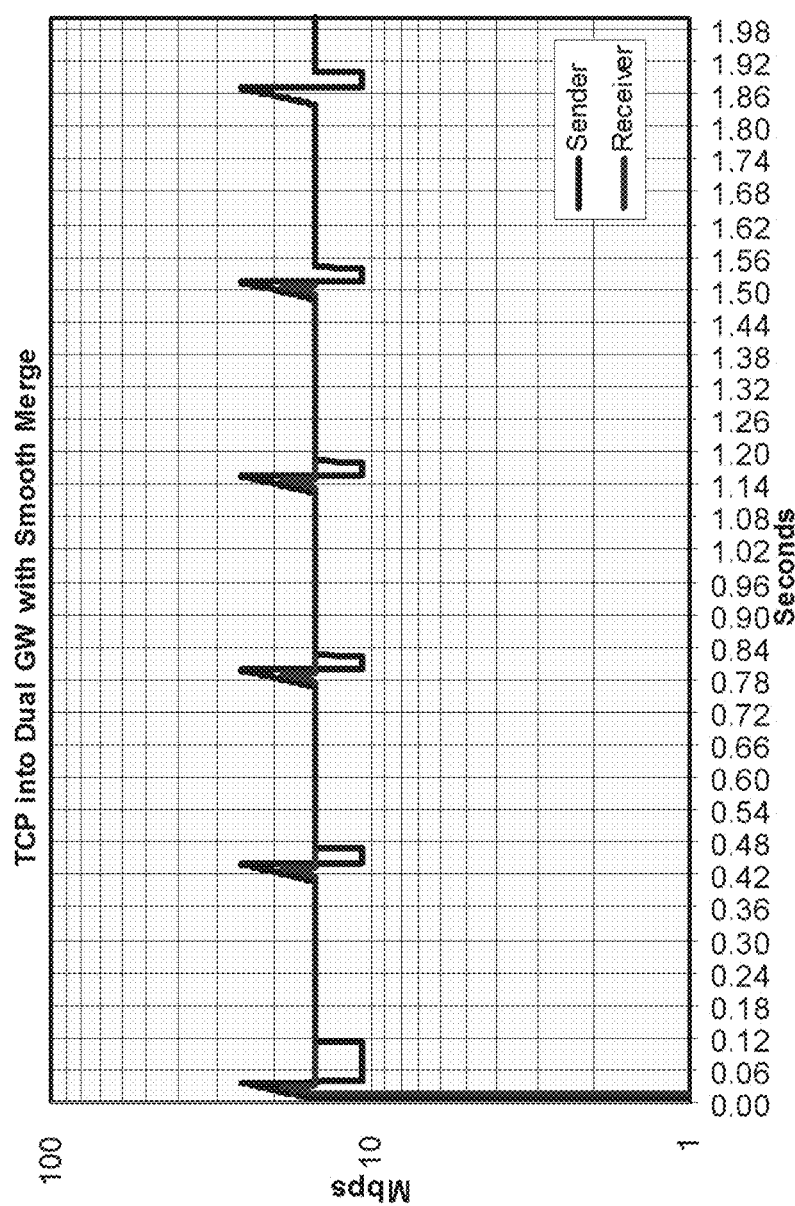
FIGS. 14 and 15 are charts showing the results of a Smooth Merge process on a CCC-device.
Figure 15:
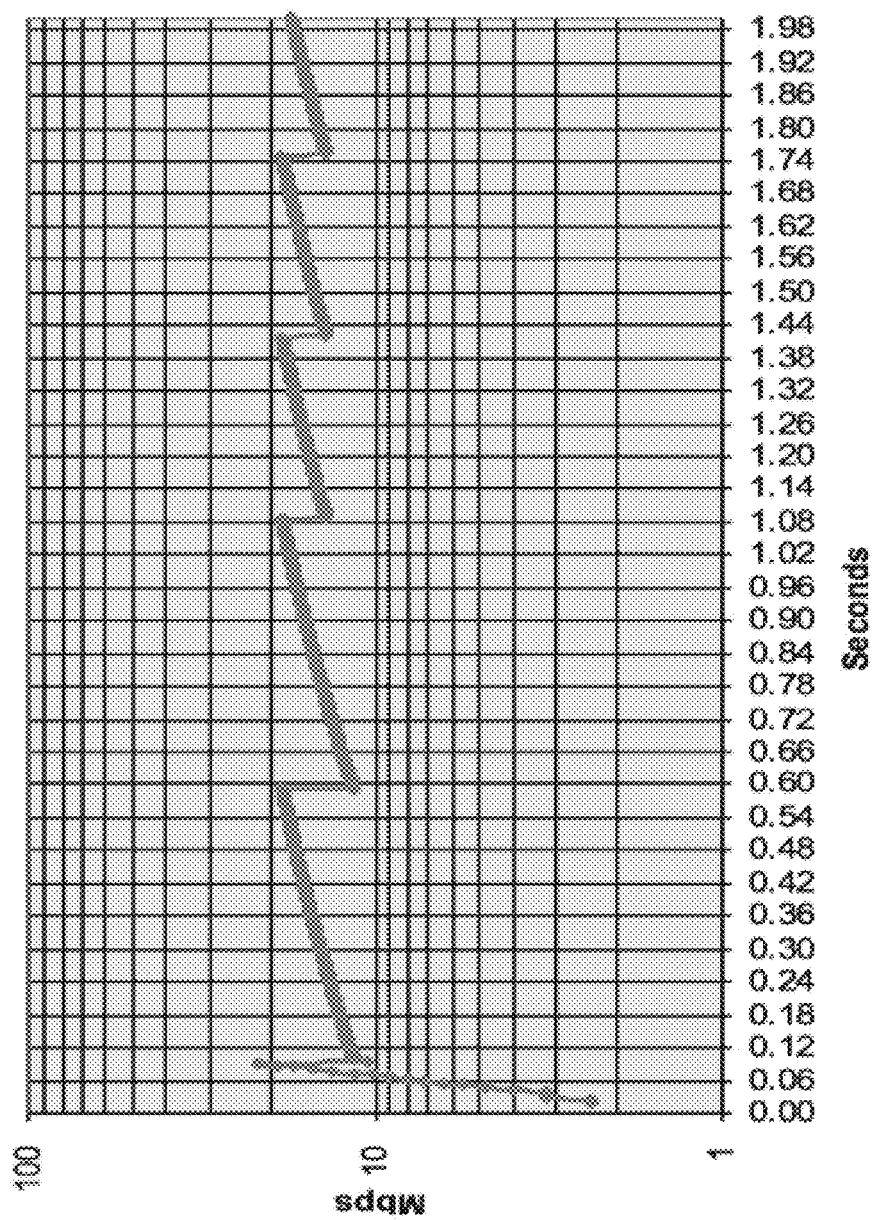

FIGS. 14 and 15 show the Smooth Merge where the Sender CCC-Device peaks above the receiver, then drops, and when merged returns to the receiver rate. The receiver is at rate in 30 ms whereas on the top with standard TCP the sender peaks in 92 ms and starts its saw tooth behavior getting the receiver to rate in 100 ms. Both trunks have 15 ms RTTs. Smooth Merge involves two ramp rates for the sender end and holding a fixed rate to the receiver after a receiver loop error while signaling the $1^{st}$ CCC-Device to slow the sender to 50% of that rate.

Packets are saved in the second CCC-Device as they arrive too fast for the receiver rate. This process allows the first CCC-Device to determine exactly when to raise the rate up to the receiver rate so that the packets received by the second CCC-Device just merge into the receiver as the saved packets have all been sent. Thankfully CCC-Devices have many cores to support complex computations to be executed in few nanoseconds to microseconds.

This insures that the receiver never loses a whole bunch of packets as happens in normal TCP when the senders double speed spray of packets arrives and cannot be slowed for the full RTT delay. In the dual CCC-Device system the sender's rate at the receiver is only modestly above the rate causing an error and is slowed quickly to 80% of that rate based on the small local loop RTT. Thus error recovery is fast and the receiver gets a fixed rate stream after the error.

When the streams have merged and sender and receiver are both held at the same rate the system waits a period and tries higher rates again every so often until fixed at the best rate obtainable. As a result, the performance where the receiver or receiver local loop are the rate limiting factor gets up to the max RATE fast, and smoothly adapts to the receive rate limit with minimal error recovery problems, much less than occur in normal TCP.

A much more precise and efficient (no packet recovery) method is to use the receiver window plus delay to control the rate. The sender is mandated to not send more packets than the receiver window says can be received per RTT. The rate it then sends depends on the packets allowed, times their size divided by the round trip delay. As the receiver window has limited range the RTT can also be adjusted by delaying the fAck thus expanding the RTT. This provides a powerful ability to set the sender rate precisely to any rate (after the first few ms), Thus when a rate reduction is needed for the trunk overload, all flows can have their rate directly dropped as required a few ms after their next packet arrives. So the trunk load can be controlled rapidly in a few ms. Thus it can be held at 95% with ease. Similarly when a receiver on a flow has an error, the input rate can be dropped by 4:1 rapidly with one fAck. Another benefit is that there needs to be no saw tooth to find the receiver max rate, the sender rate can be increased smoothly at any rate slope desired. Then if an error occurs, the rate that caused it is known and the rate need not be dropped in half but 10-20% can work. Precise rate control allows dramatically smoother rates, which largely eliminate router and switch packet losses for the flows. This applies to all routers in each flows path. Applied to all trunks in a network, router losses should go to zero.

A major problem with TCP is limiting the ability of routed networks to about 50% utilization is flow synchronization. When a router has a brief overload it drops packets from its queue. Those flows that were caught in the discard drop their rate in half and restart. Unfortunately, they all restart at the same time. When their saw tooth's peak at the same time they catch other flows in a router discard. This multiplies fast until most all flows have synchronized peaks. The router now must buffer packets during the huge peaks to smooth the load being passed to the next trunk. As a result the router delay increases toward 1 RTT. It can now operate smoothly at high utilization but the added delay hurts every flow, doubling their round trip time. This effect is sufficiently harmful to customer performance that capacity is normally added to hold the average utilization closer to 50% where synchronization is unlikely.

In the present proposed dual CCC-Device system, this problem is avoided by treating each flow separately with no common queue. Also, with short local loops at either end of the trunk and using the receiver window to precisely control flow rates with no saw tooth, the control is so rapid that any overload can be controlled quickly. As packets are not discarded to control rate, there is no synchronization. Utilization can then be increased to ≥95% without adding delay, either in the gateways or in the adjacent routers.

MSMI protocol provides communication between any two CCC-Devices (dual) establishing a closed loop control system between them with feedback in real-time. In order to stream packets across a long trunk between CCC-Devices, traditional protocols such as TCP need to receive an ACK for each packet window which adds the round trip delay (RTT) between each window. Instead, MSMI protocol locally acknowledges packets, adds signaling packets and streams the packets at the agreed rate into the MSMI Protocol. At the other end of the trunk the MSMI returns the signaling packets to their origin with the marked rate. The packets are converted back to standard rate of MSMI and exited. Again the MSMI streamlines the packets including managing the acknowledgements and packets lost in the remaining network section. Thus, the long trunk with the MSMI protocols acts as a lossless, low delay section between the two node sections at either end, insuring end-to-end reliability with greatly reduced delay and high throughput on the long WAN links.

The MSMI protocol measures the rate of each individual flow and continually adjusts the available rate flows to fill the trunk to 99% if possible. It marks the signaling packets in the flow with the maximum rate they can stream. Streaming media is generally streamed at their maximum arrival rate. Packets are not dropped to slow the end application; the rates provide that sort of feedback, which the MSMI protocol manages through delayed ACK's and local buffering.

The following table shows the difference between MSMI and TCP/IP or a 10Gbps Trans-Atlantic trunk of 3459 miles (i.e., New York City, USA to London, UK), with a fiber speed of light delay at 28 milliseconds, and packet groups having a size of 65 kB.

|  | TCP/IP | IB/iWarp MSMI |
|---|---|---|
| 50% Average Load |  |  |
| One-way Delay | 28.0 ms | 28 ms |
| Gap between packet groups | 56.0 ms | 0 ms |
| Max Throughput/thread 9.3 Mbps* | 5,000 Mbps | ~10,000 Mbps |
| 90% Average Load |  |  |
| One way delay | 83.0 ms | 28 ms |
| Gap between packets groups | 166.0 ms | 0 ms |
| Max Throughput/thread | 3.1 Mbps | ~10,000 Mbps |
| Packet Loss (adds major delay) | 1-3% | 0% |

Thus, besides cutting delay, MSMI streams packets, as opposed to forcing packets to wait for ACKs, which at long distances causes very low throughput. MSMI-Flow control mechanism (~20M flows) returns the traffic to its maximum throughput.

In order to stream packets across a long trunk, TCP needs to receive an ACK each packet window which adds the round trip delay (RTT) between each window. Instead, the MSMI locally acknowledges packets, adds signaling packets and streams the packets at the agreed rate into the MSMI Protocol. At the other end of the trunk the MSMI returns the signaling packets to their origin with the marked rate. The packets are converted back to standard rate of MSMI and exited.

The MSMI streamlines the packets including managing the acknowledgements and packets lost in the remaining network section. Thus the long trunk with the MSMI protocols acts as a lossless, low delay section between the two node sections at either end insuring end-to-end reliability with greatly reduced delay and high throughput on the long trunk. The MSMI protocol measures the rate of each individual flow and continually adjusts the available rate flows to fill the trunk to 99% if possible. It marks the signaling packets in the flow with the maximum rate they can stream. Streaming media is generally streamed at their maximum arrival rate. The MSMI protocol also has an extremely effective traffic monitoring display including showing the rates and applications. Packets are not dropped to slow the end application; the rates provide that sort of feedback, which the MSMI protocol manages through delayed ACK's and local buffering.

The purpose of the MSMI protocol is to help referential decoupling and to be suitable for algorithm development, as the developer can focus on the actual algorithm and not on where the data actually is or how (or how efficiently) it is transferred. The protocol has the following goals: 1) achieve a wide area high performance implementation of single super computing device with multiple distributed computing nodes interconnected as fabric, forming "Fabric as System Technology" (FaST); and 2) allow programs to access any memory location any memory mapped I/O devices within/ across FPGAs which may be geographically distributed thousands of miles apart with a high degree of efficiency.

The MSMI protocol supports unified programming model across CCC appliances with thousands of cores. The protocol connects two CCC-DEVICE appliances with following built-in mechanisms: Shared Memory Interconnects, and Cache Coherency. The protocol design is based on three principles: (1) Transmission of Scalable memory sizes; (2) Access to Global shared memory address space; and (3) Cache/Memory coherence. An efficient wide scale implementation of a FaST, one of the most powerful and at the same time "programmer-friendly" paradigms in parallel programming would leverage the usage of optical networks on a larger scale and for more applications.

Shared memory interconnects often perform well when communicating within a box/machine or across two boxes which are apart few meters up to 20 mts within a room. They usually depend on TCP/IP for their box-to-box communications requirements. While these cable lengths are acceptable to a certain extent, they fail to extend the reach of fabric of boxes beyond a single machine room or a building. This imposes a severe performance penalty on utilizing boxes for communications/computing, which are miles apart at WAN distances for HPC. Adding on to this, a latency addition of about 5 us per km of distance is observed and these larger wire latencies cannot be hidden from the applications used for computing and communicating. Hence, the communication protocols used for Shared Memory Interconnects over WAN need to be designed.

A thorough understanding of SMI over WAN communications is needed for different transport protocols with respect to WAN delays and communication patterns in order to effectively redesign existing HPEC long-haul communications and design the next generation's HPEC based systems.

The MSMI protocol supports any optimizations to enhance over-all communications performance over WAN and accommodates small WAN delays up to (100 us) and still sustain performance. The protocol utilizes large size packet transfers and parallel communication streams to improve the bandwidth utilization of the WAN link significantly. The protocol supports a CCC-DEVICE fabric's intra-fabric communications design to offer low latency and high bandwidth. The protocol supports both Send-Receive and Memory-to-Memory transfer semantics over FPGA cores.

The protocol provides Reliable Connected (RC) transport mechanism for SMI over WAN for long distances with complete reliability. The protocol supports communications with jumbo packet sizes of up to ⅝16 GB. The protocol handles scaling with significant number of FPGA processing cores sharing data to avoid overloading interconnect between CCC-DEVICE nodes with coherency traffic which would seriously reduce real data throughput.

All tasks on one CCC-DEVICE appliance can access all memory and IO resources of other configured CCC-DEVICE appliance in a fabric of CCC-DEVICE appliances. This is of great value to users and the ultimate way to virtualization of all system resources.

CCC-Shared Memory Architecture

In the current existing Distributed Shared Memory systems the global shared address space which is formed out of the segments in the local memories are designated as shared and mapped to this space through programmable mapping tables. This type of traditional architecture requires a hardware implemented update mechanism at a fine data granularity.

In contrast, in the CCC paradigm the computing and communications are connected as one through the memory reconfigures the hardware programming of any application through dynamic systolic arrays. These systolic array pathways, which are part of the hardware drives the data from node as self-steering in real-time making the remote data available locally always. This does not require any replication algorithms or coherence models to keep data updated in non-demand, anticipatory manner with typical broadcast or multi-cast to all nodes. Thus, CCC-compute nodes do not stall on writes, and computation overlaps with communication. This is a main source of performance improvement typical for relaxed memory consistency models.

CCC's self-steering systolic pathways ensure no contentions and latencies in memory accesses as the CCC's inherent MSMI protocol makes these physical systolic pathways into MSMI flow control mechanism for remote memory access ensuring unrestricted access to shared data and simultaneous access to local memory. This is very fundamental to CCC technology as there is no difference between space (memory/cores) and time (latency) make any geographically distributed compute nodes as one single big computing system.

The various embodiments disclosed herein can be implemented as hardware, firmware, software, architecture or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown.

Figure 17:
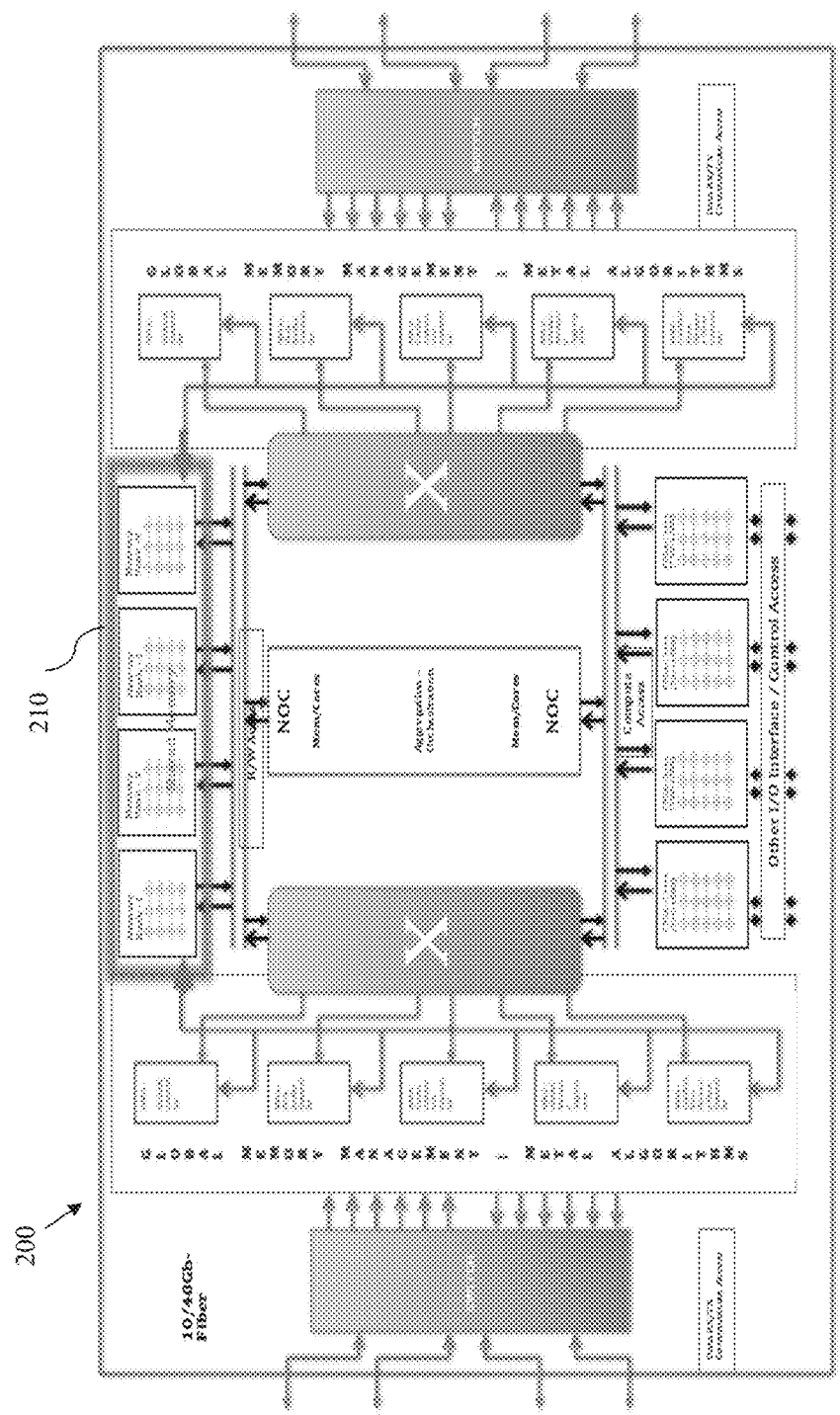
FIG. 17 is a diagram illustrating a shared memory architecture implemented on a single FPGA.
Figure 24:
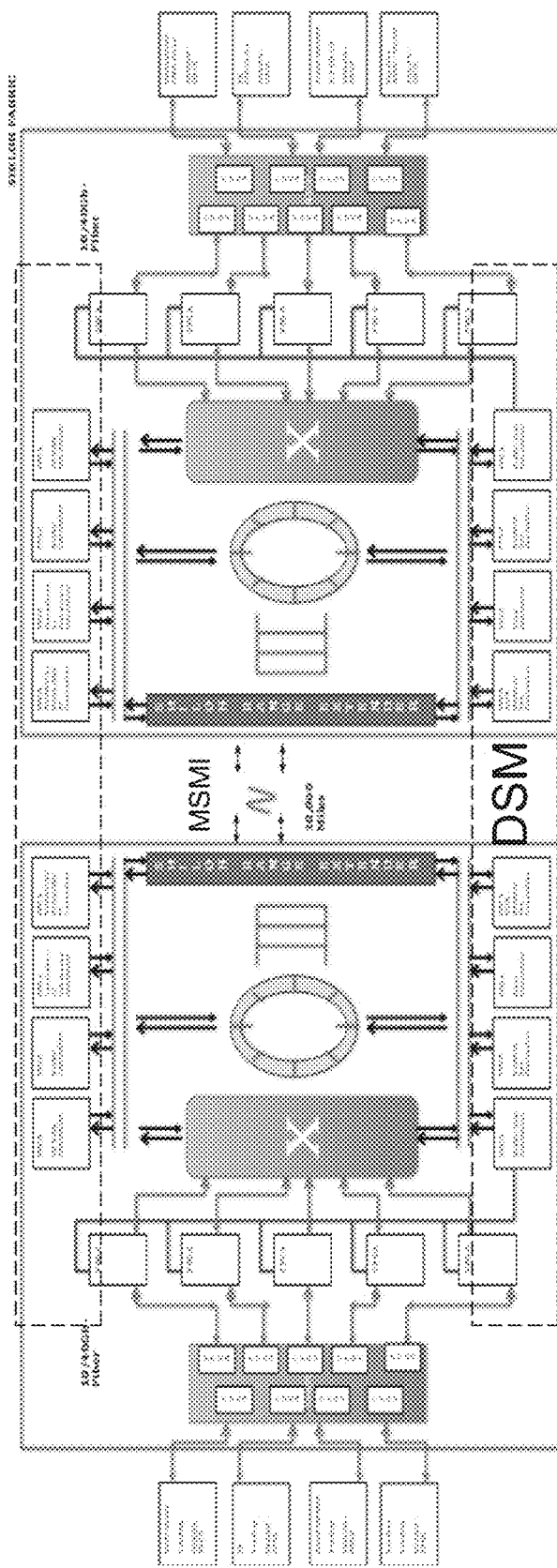
FIG. 24 is a diagram illustrating a shared memory architecture implemented on multiple CCC-Devices.

FIG. 17 illustrates how a shared memory architecture 210 can be implemented on a single FPGA 200. Within an FPGA, the implementation of shared memory is based on a Centralized Shared Memory 200. It supports large-scale dense CCC-cores based systems for direct information sharing as well as scalable Interconnection Network Based on MSMI protocol. As shown in FIG. 24, shared memory is distributed across the CCC-Devices and frequently accessed locations are always local.

Mapping all FPGA's local shared memory onto a global address space shared by all FPGA's CCC-cores creates a virtual global memory and provides global memory transparency across FPGA's with Extreme Low Latency Memory access performance. A self-steering systolic array based Shared Memory Algorithm is used to maintain consistency. Virtual global memory is created across the CCC-Devices by mapping all CCC-Devices local shared memory into a global address space shared by MSMI Protocol over WAN links with ELL. Systolic Array based read/write replication algorithm to read/write-shared data for all CCC-cores across all the CCC-Devices.

The following CCC memory algorithms have been developed for space (memory/cores) and time (latency) continuation to make geographically distributed compute nodes as one single big computing system:
  1. Stream based multi-node memory segment access Paradigm;
  2. Data-Driven self-steering systolic array streams connecting remote memories;
  3. Rapid run-time reconfigurable systolic array pathways and pipelines for MSMI communication, i.e. memory to memory flow control; and
  4. Rapid placement and routing of systolic arrays on reconfigurable multi-cores for dynamic access of remote memory space.

These algorithms ensure compute node fabric configuration, their network connectivity, coherence unit granularity and strong coherence policy, which make computing and communication continuity across the computing node without any space-time difference.

CCC Programming Model

In CCC programming, computation is based not on threads, but on dynamic systolic array networks. In such circumstances, the programmer no longer has to worry about locks and indeterminacy of thread-based code, since the CCC programming regulates data flow within the networks of the systolic arrays and handles all issues related to task dispatch and synchronization.

A programmer can write his/her program in any sequential language or command interpreted language and he/she need not modify the existing code when it is run in CCC-programming model. The built-in environment automatically reads the code converts the code into dynamic systolic arrays and smears the network of systolic arrays onto the multi-core without any intervention of the programmer and runs on CCC multi-core achieving super-computing.

Figure 25:
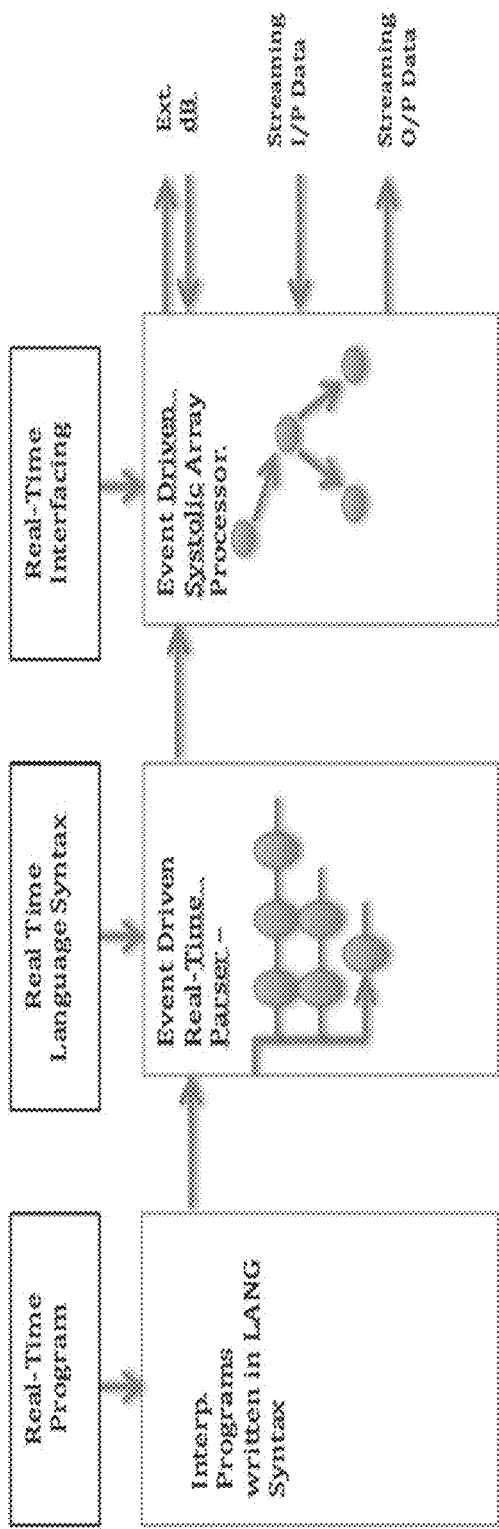
FIG. 25 is a diagram illustrating the major steps of converting any programming language into a CCC-Programming environment in accordance with an embodiment of the present invention.

FIG. 25 explains broadly in 3 major steps how CCC-Programing model converts any programming language into a CCC-Programming environment: (1) load any programming language into the CCC-Device's memory; (2) a built-in Parser, parses the programming languages grammar to form a schematic tree of commands (Parser, itself is a built in systolic array resides in memory); and (3) convert these Schematic tree nodes into a dynamic systolic array networks to run on CCC-many cores.

Figure 16:
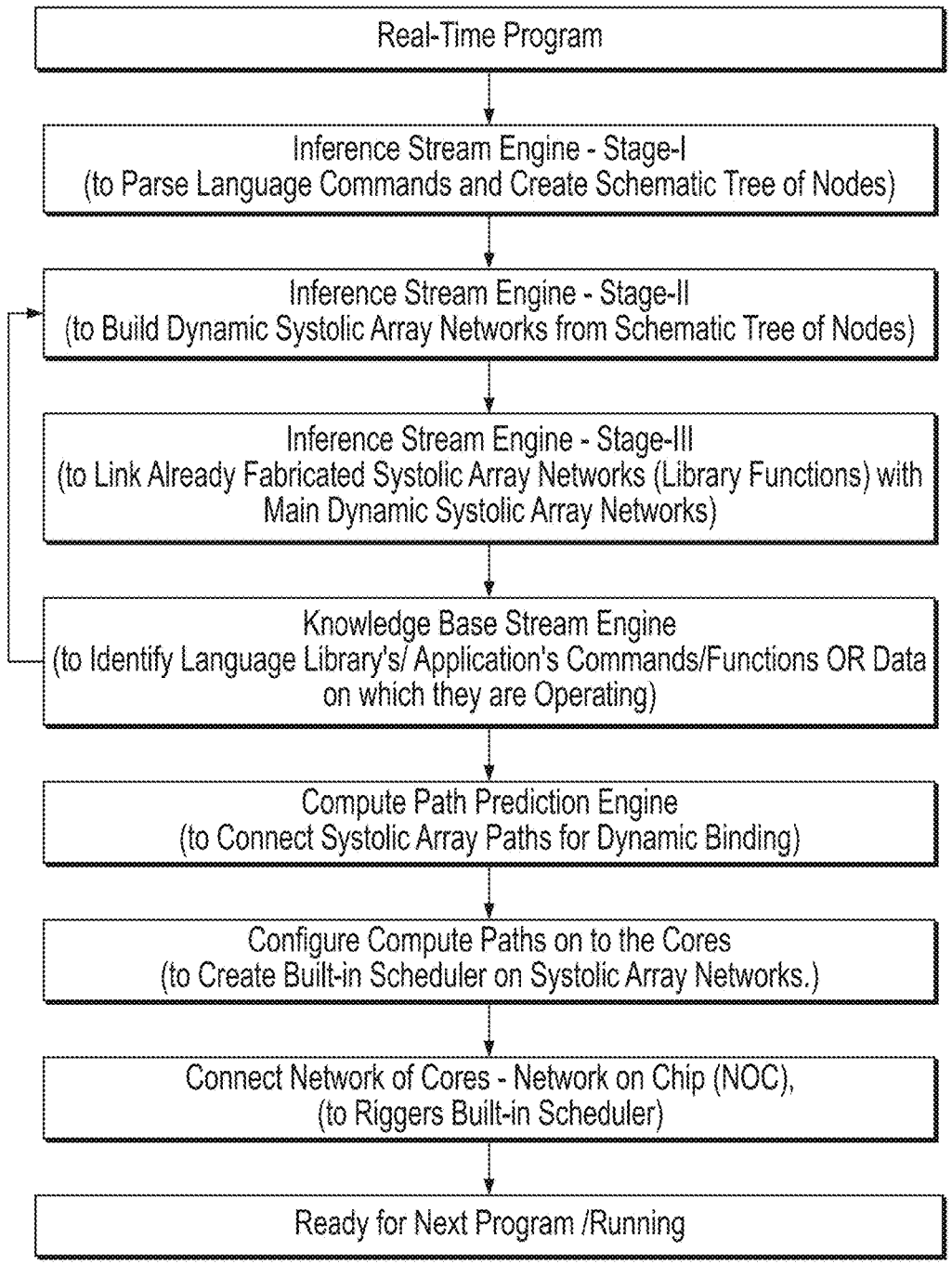
FIG. 16 is a flow chart illustrating how typical C/C++or Command Interpreted Language program can be executed to achieve parallel processing on multi-core using CCC-programming in accordance with an embodiment of the present invention.

FIG. 16 illustrates how any sequential (C/C++) or command interpreted (MATLAB/SLANG) program can be executed in CCC-programming model. In Stage 1, the Inference Stream Engine synthesizes any programming or command interpreted language command lines and synthesizes them as command streams with both data and the code on which it is operating on to schematic tree of nodes. This also fabricates the schematic tree of nodes to have explicit control over the data and the ports assigned for I/O. At Stage 2, the Inference Stream Engine transforms Stage-1's structural specification of application commands into streams of systolic arrays for run-time configuration. Based on this information it constructs a data flow graph for the code on each cell of the systolic array from the first stage. Each sub command on individual cell further explodes (Fissions) into another systolic arrays. Placement and routing module assigns each cell of the systolic array a core and routes the interconnectivity of them through the network connector (NOC). The results of each systolic array are assigned a port to report the final result.

At Stage 3, the Inference Stream Engine does not deal with the individual cores or the ports, but links to the already fabricated systolic arrays (library) functions of Financial Engineering models such as Monte-Carlo methods and Risk Management models maybe on a different FPGA core or conventional server. The results of each systolic array are assigned a port to report the final result.

The Knowledge based stream engine then determines language commands/user developed application specific commands vs. the data and the code on which they are operating. This also acts as a dynamic reference data system to identify already fabricated commands on the systolic arrays. Thereafter, the system evaluates possible compute paths on the systolic arrays. Based on certain real-time parameters from data feeds and computed implied volatilities possible arrays of systolic cells are created. At run time, based on the prevailing values of these parameters the correct systolic cells are placed in the compute path. The solution also accommodates rapid run-time reconfiguration of all possible systolic arrays offering random access to configurable resources, which in turn enables configuration controllability. At run time, based on the prevailing values of these parameters the correct systolic cells are placed in the compute path, which provides real-time dynamic binding of command interpreted language's functions in any application.

FIGS. 26A-26D illustrate an example of how a program is converted into CCC-programming. In this example, one is tasked with evaluating the price of Interest Rate Variance Forward contract price at implied volatilities and hedge it with zero coupon bonds or Swap options on bonds (e.g.: Eval_Price IRV_Forward @ Imp_Vol && Hedge with ZCBonds ||Options_on_Bonds).

The present problem is interpreted on single processor environment sequentially and the response from the existing system will slow and when any parameter is changed it takes the same amount of time in responding. The above command statement can be run on multi-core environment working parallel on many cores. Executing the above command on multiple cores on FPGA or on conventional servers makes the response to be at wire speeds.

Figure 26A:
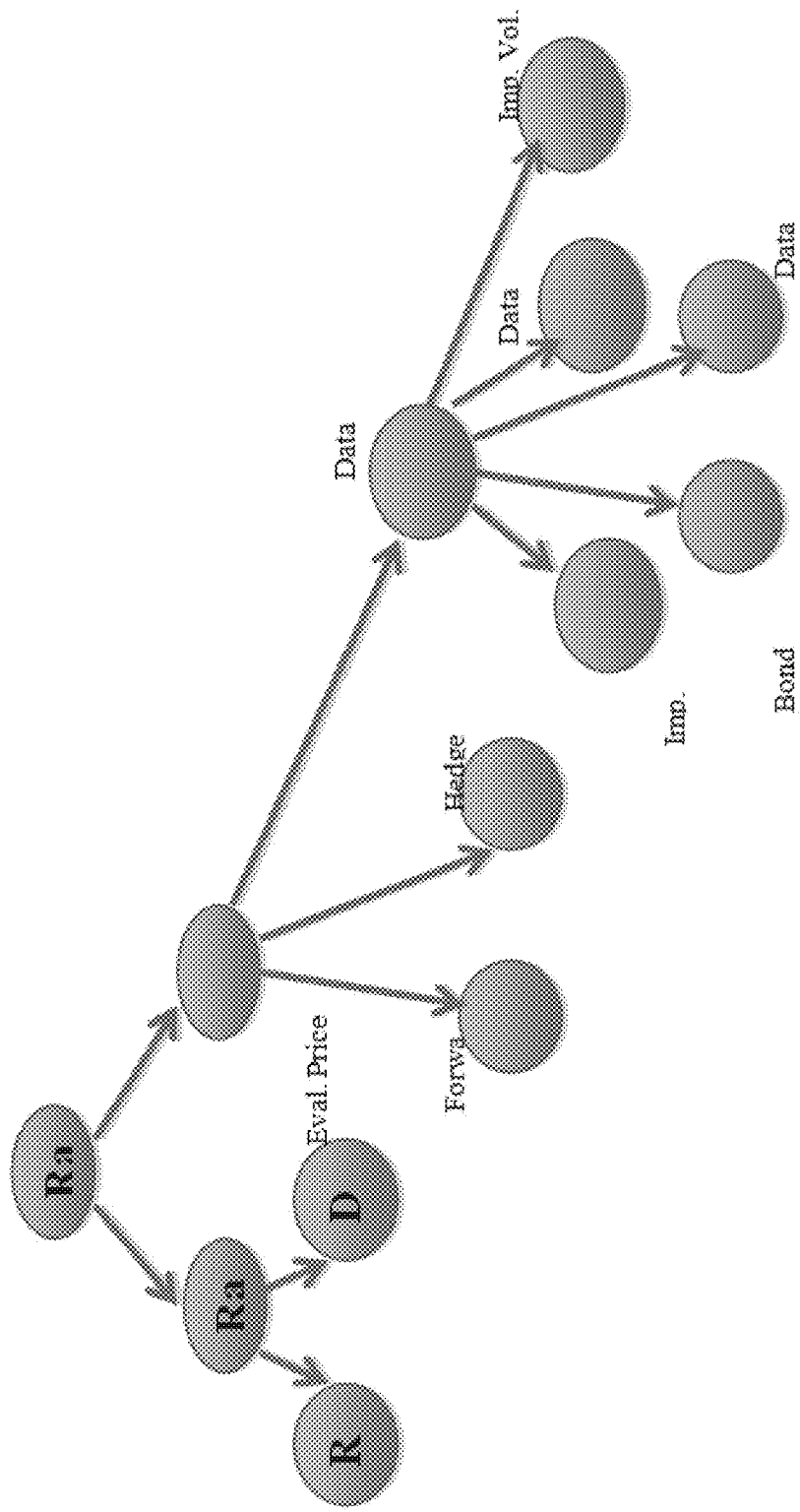
FIG. 26A-26D are a set of diagrams illustrating an example of how a program is converted into CCC-programming.
Figure 26B:
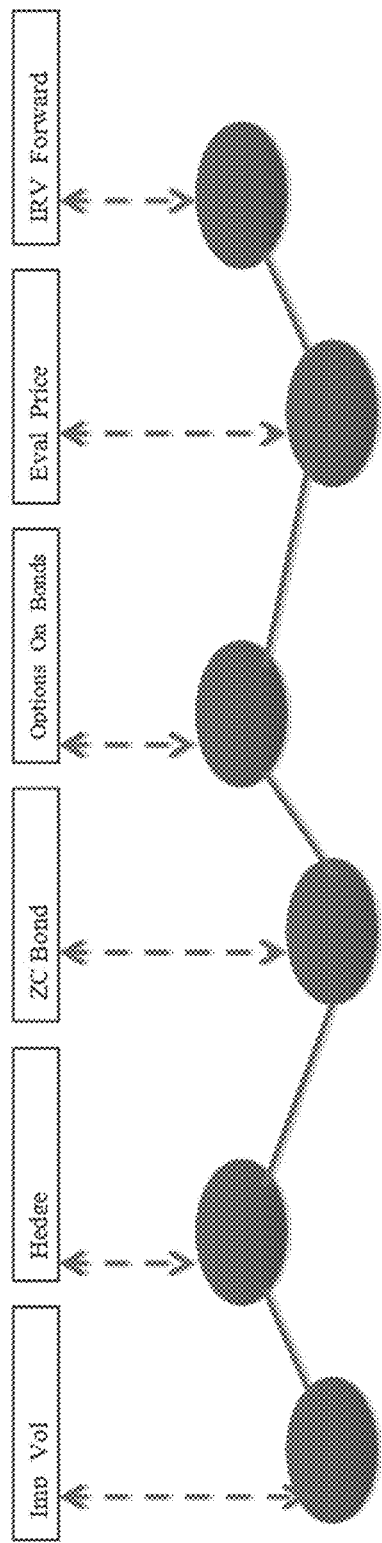

FIG. 26A illustrates how parsing is performed by a real-time systolic array. In the present problem, the above programming command has 6 sub-commands: [Imp. Vol.], [Interest Rate], [Bond Type 1], [Bond Type 2], [Eval Price]; and [IRV Forward]. In the FissionStream solution, these 6 sub-commands form a systolic array with 6 cells. Each cell of this systolic array configured on a computing core. The resulting systolic array is shown in FIG. 26B.

Figure 26C:
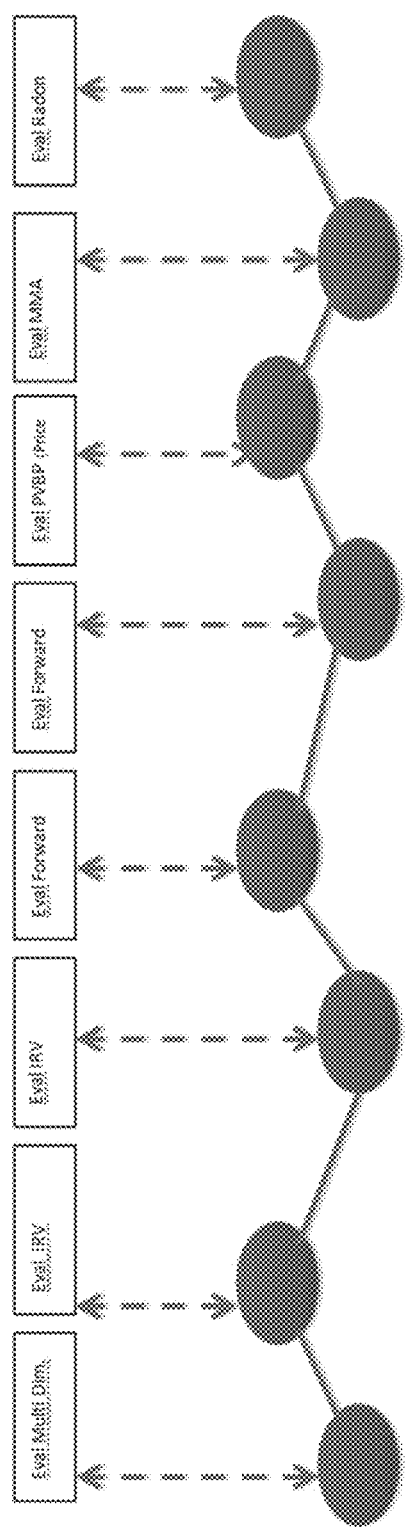
Figure 26D:
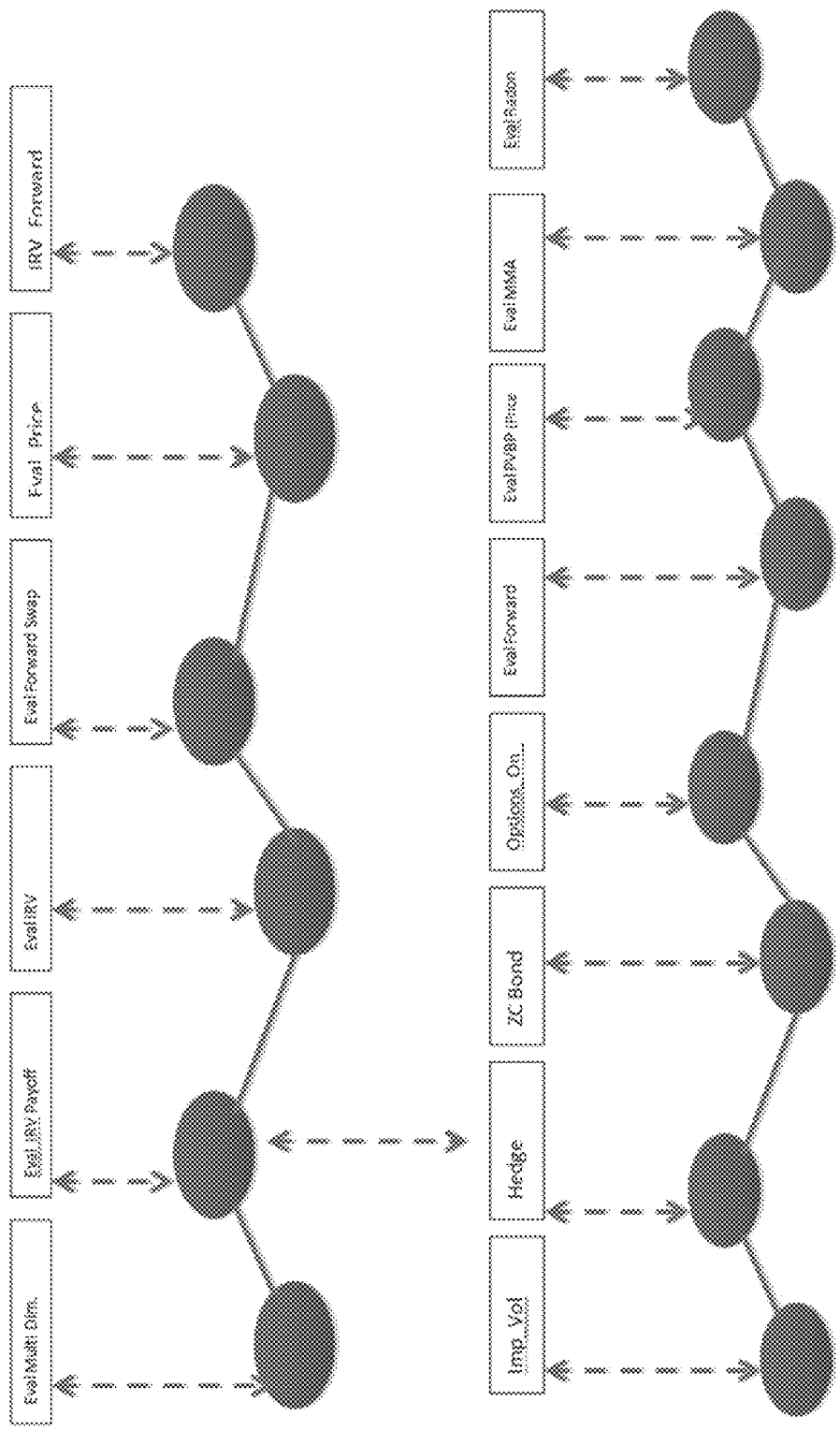

The core idea is to take an interpreted language code and build a real-time systolic array as the language fed through the system. Now each sub command (e.g. IRV_Forward, Hedge) may again have their own sub-commands: [Imp_Vol]; [Hedge]; [ZC Bond]; [Options_On_Bonds]; [Eval Forward Swap Rate]; [Eval PVBP (Price Value Basis Point)]; [Eval MMA]; [Eval Radon Nikodim RNP]. The cells corresponding to the sub-commands will further explode (Fissions) into another systolic array with eight cells, one for each sub command as shown in FIG. 26C. FIG. 26D shows the systolic arrays shown in FIGS. 26B and 26C together.

Similarly, all the cells of the systolic array discussed above again fissions (explodes) into their own systolic arrays, forming a network of systolic arrays. This fission of systolic arrays takes place until there are no more functions in any cell of any systolic array (i.e. recursively flowing the run-time systolic arrays (RTSA's) down to Individual Primitive Operations, Primitive Functions, Individual dB Queries, and Individual I/O operations). Thus, this recursive process builds a network of systolic arrays running on massive number of computing cores.

These networks of systolic arrays execute their own primitive operations simultaneously in clock pulse achieving wire speed execution of price evaluation of Interest Rate Variance Forward contract with proper hedging either with Zero coupon bonds or with options on bonds. If any parameter is changed in the command parameters or in the feedback loop, the same systolic array will execute with the new parameters giving results in wire speeds.

Figure 27:
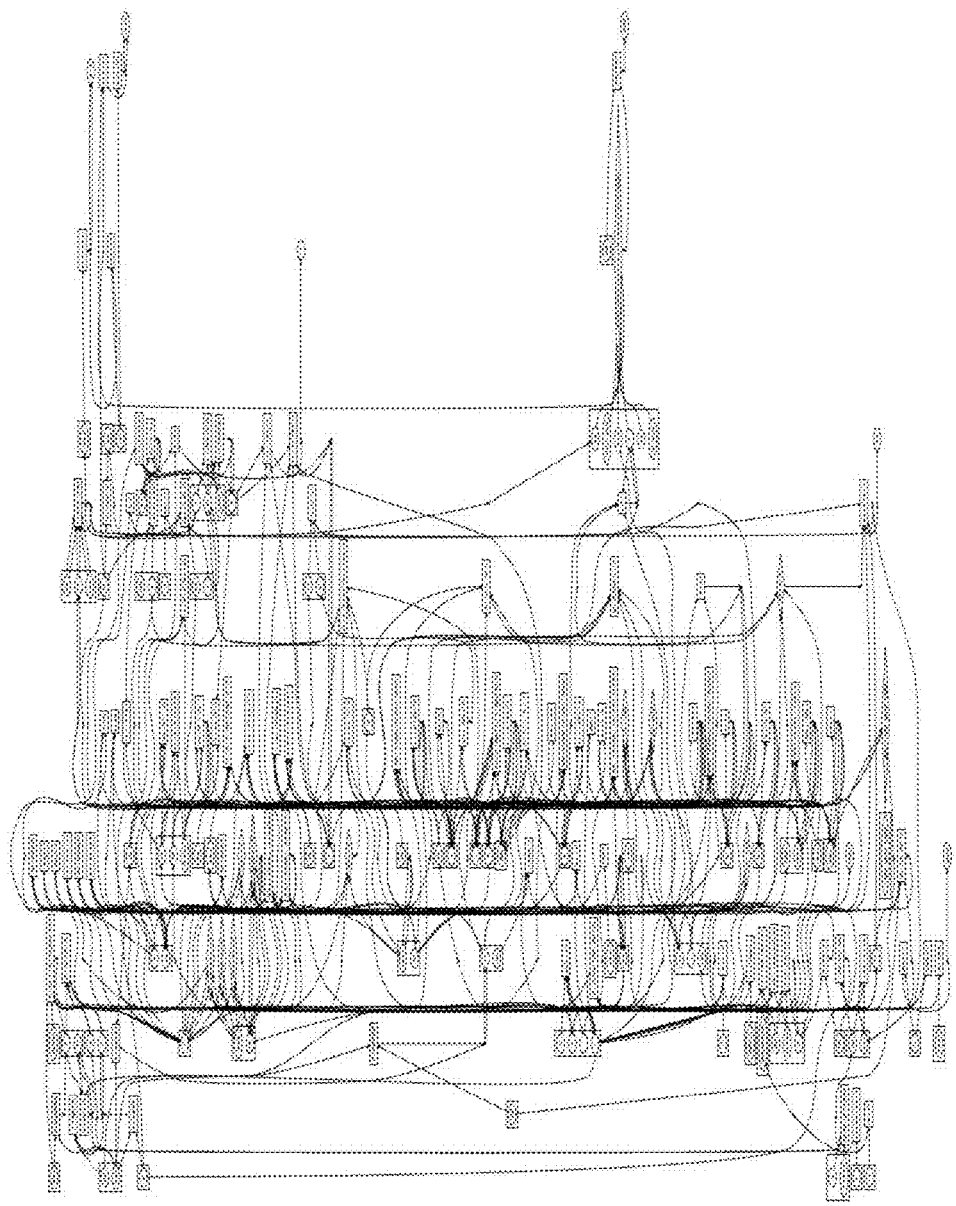
FIG. 27 is diagram showing a snapshot of entire program in CCC-Device memory-Network of Systolic Arrays on Multi-core.

FIG. 27 shows how CCC-Programming Model converts any Application written in conventional programming languages becomes a Dynamic Systolic Array of Networks in Memory, how they look in memory. Thus, CCC-Programming model converts any application's programs written in C/C++ or Command interpreted languages become a network of systolic arrays working on thousands of multi-core providing high computing power.

The FaST Model

Real-time information is critical. With changes in today's markets and daily alterations in exchange platforms and specifications, trading horizons need to extend further forward than ever. Customers need real time access to execute and capture trades across multiple exchanges and instantaneously and accurately incorporate that information within their risk management system. Needless to say, in Financial Markets microseconds can mean millions of dollars to trading firms. Ultra Low latency solutions built on holistic, experience driven and pragmatic approach can systematically shave time to provide ultra high-speed inter connectivity between exchanges and facilitate financial markets to trade financial instruments across the exchanges including algorithmic and high frequency trading especially in the cross-asset trading arena. By understanding the market trends, one might conclude that algorithmic and high frequency trading are the main drivers behind increasing network bandwidth demands.

Five trading industry trends are key to understanding how the complexity of financial services markets translates into trading network connectivity considerations:

Increasing geographical market diversification;
Increasing asset-class diversification;
Expanding numbers of financial markets participants;
Exponentially expanding data volume; and
Financial industry regulatory impact.

The principle of CCC addresses such a demand and pave way to the development of "Fabric as System Technology" ("FaST"), which can truly integrate the connectivity of the geographically distributed CCC Devices in real-time with extreme low latency and high throughput.

Fabric as System Technology achieves low latency computing and communications capabilities by interconnecting the CCC Devices with hundreds of processors on FPGA forms a fabric, provides following tenets:

One Machine, multiple instances across geographically distributed exchanges/brokers/clients
Applications run without Compile/Link/Run and without OS or Protocol Stack burden.
Multiple geographically distributed CCC-Devices can be connected using CCC-MSMI in real-time to achieve super computing for processing large data sets over the applications.

Figure 18:
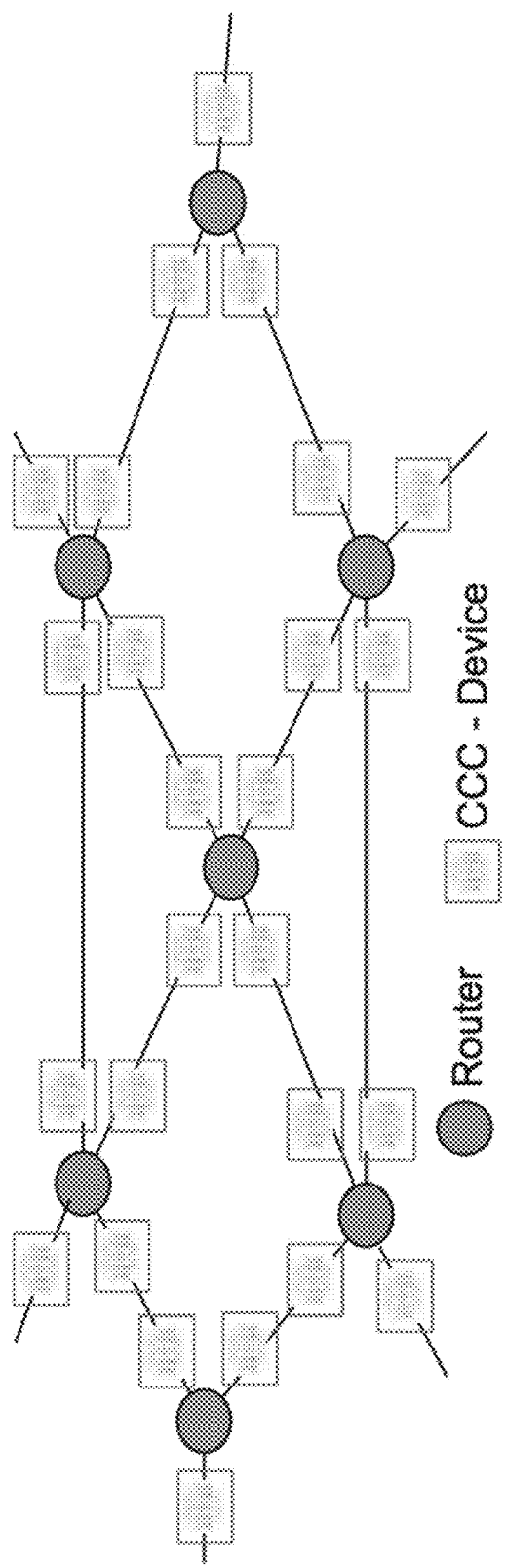
FIG. 18 is a diagram illustrating a plurality of CCC-devices being utilized as a fabric of devices.

The proposed FaST design supports expansion of fabric by adding new CCC-Devices and is very unique providing distributed super computing and communications connecting multi-source data of multiple CCC-Devices. The architecture of the platform supports adding of new CCC-Devices as new building blocks without disturbing the existing business mechanisms and grows from single point CCC-Devices to geographically distributed CCC-Devices to cater the data transmission/distribution and computing services to the wide range of subscribed client data-centres. The FaST technology unites all the processors, memory and IO resources of all the CCC-Devices and provides unified access to all of them on metal by Metal Shared Memory Interconnects (MSMI). Any process running on any CCC-Device in the system can use any part of the FaST memory regardless of the physical location of the memory is on a different CCC-Device. Strong Coherency Model over MSMI and FPGA based multi-core computing CCC-Device nodes provide high performance from the FaST architecture. FIG. 18 illustrates a model of how FaST is implemented.

MSMI Coherency Model provides scalable fabric of CCC-Devices supporting unified programming model that stays the same from the single multi-core FPGA used CCC-Device to the largest imaginable single system image FaST that may contain thousands of processors. MSMI provides very low latency of about 5.0 μs per mile and a high bandwidth up to 2Gbytes per second. As there is no OS or protocol communication overhead, a strong coherence improving response latency is provided.

Compared to conventional processing nodes like Xeon/Arc cores, CCC-Device nodes with FPGA cores deliver supercomputing power at 1/100th the cost and 1/200th the power consumption while providing the highest compute density. This benefit becomes more attractive when a large volume of datasets has to be generated and disseminated, significant computation is needed in data-center nodes. Applications running on FaST can therefore benefit from real-time data with a strong coherence guarantee at little cost. A collection of CCC devices connected to trunks can operate as a FaST closed subnet to insure minimal delay, no loss, and high throughput. The CCC devices will not queue or drop packets since all links to the other devices are flow controlled not to overload by controlling all the flows end-to-end memory.

Figure 19:
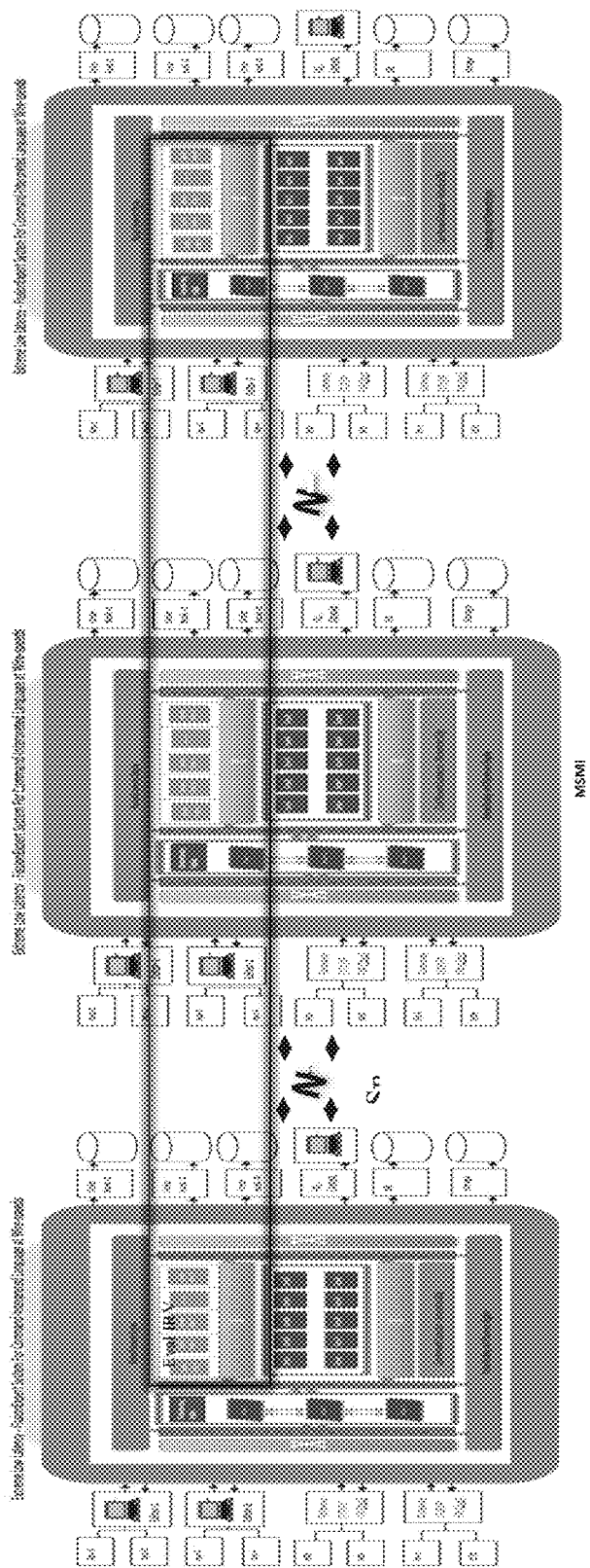
FIG. 19 is a diagram illustrating a collection of CCC devices connected to WAN trunks, forming a multi-device system acting as a single system.

FIG. 19 illustrates a collection of CCC devices connected to WAN trunks, which form a multi-device system acting as one system under FaST. FaST supports unified programming model across CCC-Devices with thousands of cores. These devices may be within several yards to several 10,000 of miles. Using FaST, CCC-Devices at multiple locations Exchanges/brokers/clients on WAN links act as one Machine running both computing trading algorithms and communicating trades across the exchanges. The FaST design is fully based on High Performance Embedded Computing (HPEC), applications run without Compile/Link/Run and without OS or Protocol Stack burden. Multiple geographically distributed CCC-Devices connected using CCC-MSMI on WAN links achieve supercomputing for processing large sets of data in real-time.

Device Polymorphism

Device Polymorphism is a concept from CCC Technology meaning there can be many devices each CCC-Device acts both as Gateway or Compute Node but they act as one device. In other words one machine/device/appliance, with multiple instances spread across time zones. For E.g. the CCC-devices/appliances all communicate e.g., "distributed market data computed information" or other information across all the devices/appliances and the same content is available whether it is used or not. As an example this capability means as market trends change, trading rules/strategies may change accessing different technical indicators from other devices.

All devices/appliances have the same system software but the individual "machine's" horsepower may vary based on their specific configuration type and function. These different types of the devices/appliances based upon function/application include: CCC-Edge, CCC-CR & CCC-XR.

As an example, the CCC Edge may be at CO-Lo of the exchanges, traders or particular other trading venues/client locations such as other banks, etc. The devices/appliances all do some common activities like processing market data across the time zones i.e., implied volatility, arbitrage conditions (continuously compute price variations), speculation, and hedging. When necessary any two devices/appliances can communicate independently for a particular business decision to be executed.

If we interconnect two exchanges (E.g. CNX-HKEX) by a fabric of CCC devices, we can see how they are acting on multiple roles as matching engines at the CO-Lo of exchanges, clearing engines are the clearing houses, or as a Gateway at the brokers/service providers facility. Though all these devices act as one system their functional behavior is determined by the superimposed characteristic functions.

Figure 20:
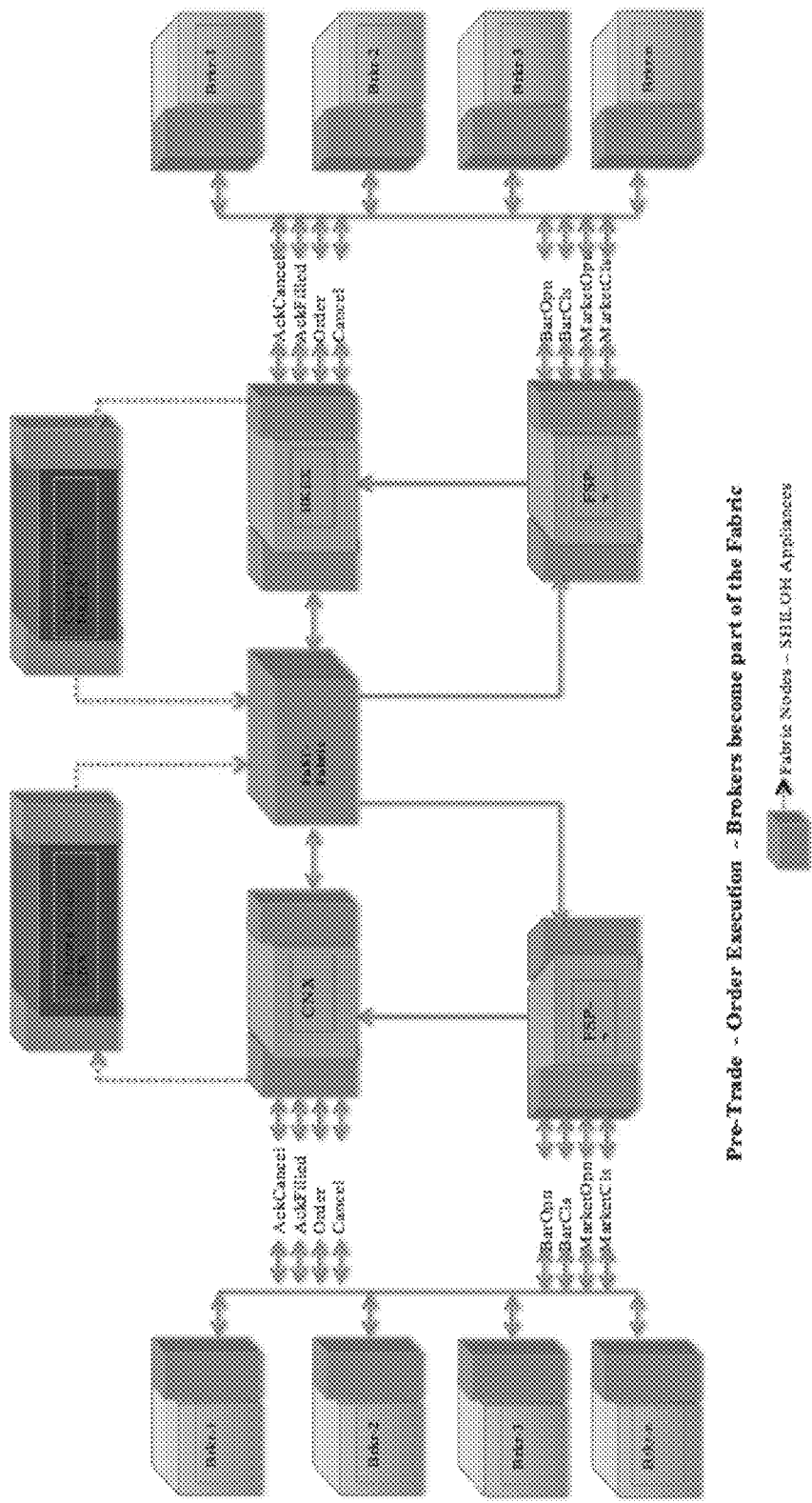
FIGS. 20 and 21 are diagrams illustrating how Fabric as a System Technology ("FaST") can be utilized in a financial trading environment using device polymorphism.
Figure 21:
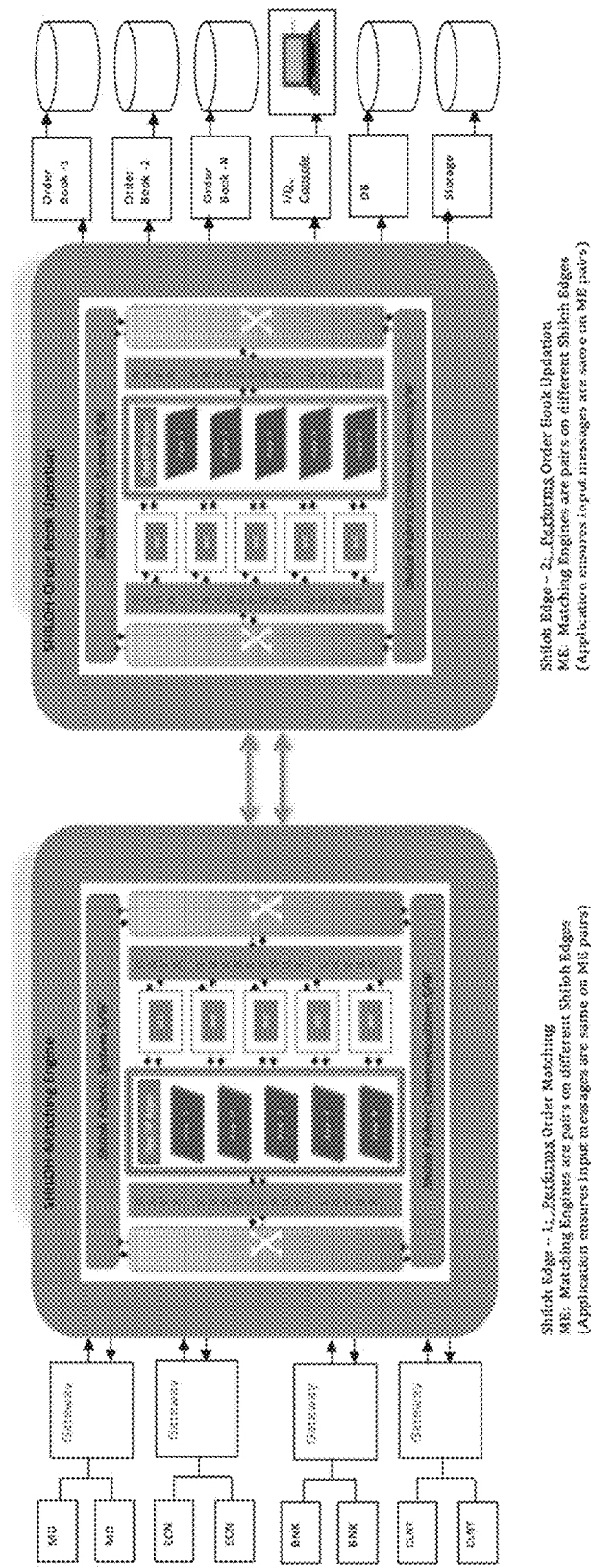

FIGS. 20 and 21 show how FaST can be utilized in a financial trading environment using device polymorphism. If two exchanges (E.g. CNX-HKEX) were interconnected by a fabric of CCC devices, one can see how they are acting on multiple roles as a matching engines at the CO-Lo of exchanges, Clearing engines are the clearing houses, or as a Gateway at the brokers/service providers facility. Though all these devices act as one system, their functional behavior is determined by the superimposed characteristic functions.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It will be understood that the embodiments described herein are merely exemplary and that a person skilled in the art may make many variations and modifications without departing from the spirit and scope of the invention. All such variations and modifications are intended to be included within the scope of the invention as disclosed herein.

We claim:

1. A compute-communicate-continuum ("CCC") device comprising:
    an integrated circuit including a plurality of processing cores, a plurality of memories, at least one controller, and at least one input/output interface, said plurality of processing cores being physically connected to said at least one controller and said at least one input/output interface, each of said plurality of processing cores being physically connected to a corresponding one of said plurality of memories, said plurality of processing cores being configured for use as systolic array cells in a systolic array network;
    a communication subsystem that connects the plurality of processing cores to said plurality of memories and said plurality of memories to said input/output interface, said communication subsystem including a subsystem memory for storing an address for each of the plurality of processing cores, and a controller for physically controlling data traffic between each of said plurality of processing cores, between said plurality of processing cores and said at least one memory, and between said at least one memory and said at least one input/output interface;
    wherein said CCC device is configured to be connected to a different CCC device via a trunk, the trunk having a current data traffic load and a traffic capacity wherein the current data traffic load is a percentage of the traffic capacity, said CCC device being configured to execute the following steps:
        measure the current data load to determine a difference between the trunk's current data load and the trunk's capacity; and
        increase a data flow from said CCC device through the trunk so that a combination of the data flow and the current data load is between 50% to 99% of the trunk's capacity.

2. The CCC device of claim 1, wherein said plurality of processing cores are created on one or more field-programmable gate arrays (FPGAs).

3. The CCC device of claim 2, wherein each of said plurality of processing cores includes a pipeline, a data distributor, a memory unit, an execution unit, a task manager, and a data aggregator.

4. The CCC device of claim 3, wherein each of said plurality of processing cores further includes a task manager and a direct memory access engine.

5. The CCC device of claim 1, wherein the communication subsystem is a Network-on-Chip (NoC) configuration.

6. The CCC device of claim 1, further comprising a shared memory switch and a plurality of shared memory banks, said shared memory switch interconnecting said shared memory banks to said plurality of processing cores.

* * * * *